(12) United States Patent
Crabtree et al.

(10) Patent No.: US 10,936,615 B2
(45) Date of Patent: *Mar. 2, 2021

(54) TRANSFORMING AND LOADING DATA FROM A SOURCE DATA SYSTEM TO A TARGET DATA SYSTEM

(71) Applicant: International Business Machines Corporation, Armonk, NY (US)

(72) Inventors: Christopher L. Crabtree, Waite Hill, OH (US); Timothy M. Fox, Lakewood, OH (US); Maxwell T. Hallum, Lakewood, OH (US); Scott J. McCallen, Stow, OH (US); Douglas S. Meil, Chagrin Falls, OH (US); Matthew J. Wollerman, II, Milwaukee, WI (US)

(73) Assignee: International Business Machines Corporation, Armonk, NY (US)

( * ) Notice: Subject to any disclaimer, the term of this patent is extended or adjusted under 35 U.S.C. 154(b) by 36 days.

This patent is subject to a terminal disclaimer.

(21) Appl. No.: 16/377,403

(22) Filed: Apr. 8, 2019

(65) Prior Publication Data

US 2019/0258645 A1 Aug. 22, 2019

Related U.S. Application Data

(63) Continuation of application No. 15/632,430, filed on Jun. 26, 2017, now Pat. No. 10,331,692, which is a
(Continued)

(51) Int. Cl.
*G06F 16/25* (2019.01)
*G06F 16/23* (2019.01)

(52) U.S. Cl.
CPC ........ *G06F 16/254* (2019.01); *G06F 16/2379* (2019.01)

(58) Field of Classification Search
CPC .. G06F 16/2379; G06F 16/254; G06F 16/248; G06F 16/285
(Continued)

(56) References Cited

U.S. PATENT DOCUMENTS

| 7,593,922 B1* | 9/2009 | Wright ............... G06F 16/1837 |
| 7,698,634 B2* | 4/2010 | Bhatia .................... G06F 16/86 |
| | | 715/239 |

(Continued)

OTHER PUBLICATIONS

"Advantages of a Domain Specific Language Approach to Data Transformation", http://videos.trifacta.com/qt5R/advantages-of-a-domain-specific-l . . . , Trifacta Inc., copyright 2013-2015, 1 page.
(Continued)

*Primary Examiner* — James Trujillo
*Assistant Examiner* — Fariborz Khoshnoodi
(74) *Attorney, Agent, or Firm* — Will Stock; SVL IP Law Edell, Shapiro & Finnan, LLC

(57) ABSTRACT

In one embodiment, a system transfers data between source and target systems. The system receives a module including procedural logic for transforming source data of a source data model to a target data model to produce one or more target data objects for the target data model. The procedural logic is expressed by one or more elements of a domain specific language implemented by an underlying computer language. The one or more elements define mappings and structure for the one or more target data objects. The module is executed to produce the one or more target data objects for loading in the target system in accordance with the mappings and structure defined within the procedural logic by the one or more elements. Embodiments of the present invention further include a method and computer program product for transferring data between source and target systems in substantially the same manner described above.

20 Claims, 13 Drawing Sheets

Related U.S. Application Data continuation of application No. 14/831,494, filed on Aug. 20, 2015, now Pat. No. 10,318,544.

(58) Field of Classification Search
USPC .................................................. 707/736, 756
See application file for complete search history.

(56) References Cited

U.S. PATENT DOCUMENTS

| | | | | |
|---|---|---|---|---|
| 7,756,882 | B2* | 7/2010 | Aharoni | G06F 16/86 707/756 |
| 2005/0050068 | A1* | 3/2005 | Vaschillo | G06F 16/258 |
| 2006/0033809 | A1* | 2/2006 | Farley | H04M 7/0051 348/14.01 |
| 2009/0150854 | A1* | 6/2009 | Elaasar | G06F 8/35 717/104 |
| 2014/0032240 | A1 | 1/2014 | Lougheed et al. | |
| 2015/0019259 | A1* | 1/2015 | Qureshi | G06F 19/3481 705/3 |
| 2016/0323377 | A1 | 11/2016 | Einkauf et al. | |
| 2017/0052970 | A1 | 2/2017 | Crabtree et al. | |
| 2017/0293668 | A1 | 10/2017 | Crabtree et al. | |

OTHER PUBLICATIONS

Hellerstein et al., "Advantages of a Domain-Specific Language Approach to Data Transformation", Hadoop & Beyond, Oct. 16, 2014, 4 pages.

Swoyer, "An Introduction to Data Wrangling", http://tdwi.org/articles/2015/01/13/introduction-to-data-wrangling.aspx, Jan. 13, 2015, 4 pages.

Apache Camel: DSL, https://camel.apache.org/dsl.html, retrieved from internet Aug. 12, 2015, 1 page.

Apache Camel: Index, https://camel.apache.org/, retrieved from internet Aug. 12, 2015, 2 pages.

"ATL—a model transformation technology", http://www.eclipse.org/atl/, The Eclipse Foundation, copyright 2015, 2 pages.

"A Simple, Scala-based, cross-database ETL toolkit", DataExpress, http://dataexpress.research.chop.edu/, retrieved from internet Aug. 12, 2015, 1 page.

DataWrangler, http://vis.stanford.edu/wrangler/, Stanford Visualization Group, copyright 2011-2013, 1 page.

Sumner, "Make magic with Ruby DSLs", http://radar.oreilly.com/2014/04/make-magic-with-ruby-dsls.html), O'Reilly Radar, Apr. 23, 2014, 5 pages.

Meta Object Facility (MOF) 2.0 Query/View/Transformation Specification, Object Management Group, Version 1.2, copyright 2015, 262 pages.

"NRL: The Natural Rule Language", http://nrl.sourceforge.net/, retrieved from internet Aug. 12, 2015, 1 page.

"Spring Integration", http://projects.spring.io/spring-integration/, Pivotal Software, Inc., copyright 2015, 3 pages.

"The Explorys Platform", IBM Watson Health, Solution Brief, Produced in the United States of America, Nov. 2015, 4 pages.

List of IBM Patents or Patent Applications Treated as Related, Apr. 11, 2019, 1 page.

* cited by examiner

```
Publisher.create do ─── 605
  domain "ListAppointmentType" do ─── 612     ┐ 610
    key "appointmenttypeuid" ─── 614
    source "dbo.ListAppointmentType" ─── 616
  end
  domain "ListAppointmentStatus" do
    key "appointmentstatusuid"
    source "dbo.ListAppointmentStatus"
  end
  domain "ListServiceSite" do
    key "servicesiteuid"
    source "dbo.ListServiceSite"
  end                                                          ─── 620
  record "Encounter" do
    unless   @patientuid.nil? ─── 622                          ─── 630
      create do ─── 631
        map @appointmentuid   => :RECORD_ID ─── 632
        map @lastmodifieddate => :UPDATE_DATE
        map "APPOINTMENT" => :EHR_SYSTEM_ID_QUALIFIER
        map @patientuid   => :PAT_ID
        map @appointmentuid   => :ENCOUNTER_ID
        map @startdatetime    => :ENCOUNTER_DATE
634 ─── map lookup("ListAppointmentType", @appointmenttypeuid, "name") =>
        :ENCOUNTER_TYPE                                                      ─── 635
        map lookup("ListAppointmentStatus", @appointmentstatusuid, "name")
        => :ENCOUNTER_STATUS
        map lookup("ListServiceSite", @servicesiteuid, "name") =>
        :ENCOUNTER_LOCATION_ID
        map @providercaretypeuid   =>
        :ENCOUNTER_PRIMARY_CARE_PROVIDER  if  @providercaretypeuid.eql? "123"
        map @referredbyprovideruid   => :ENCOUNTER_REFERRING_PROVIDER
      end
    end
  end
end
```

FIG.6D

TRANSFORMING AND LOADING DATA FROM A SOURCE DATA SYSTEM TO A TARGET DATA SYSTEM

CROSS-REFERENCE TO RELATED APPLICATIONS

This application is a continuation of U.S. patent application Ser. No. 15/632,430 entitled "TRANSFORMING AND LOADING DATA FROM A SOURCE DATA SYSTEM TO A TARGET DATA SYSTEM" and filed Jun. 26, 2017, which is a continuation of U.S. patent application Ser. No. 14/831,494, entitled "TRANSFORMING AND LOADING DATA FROM A SOURCE DATA SYSTEM TO A TARGET DATA SYSTEM" and filed Aug. 20, 2015, the disclosures of which are incorporated herein by reference in their entireties.

BACKGROUND

1. Technical Field

Present invention embodiments relate to transforming and loading data from a source system to a target system, and more specifically, to transforming and loading data from the source system employing an initial data model to the target system employing a different data model in accordance with a domain specific language (DSL) executed by a computing device.

2. Discussion of the Related Art

Data may be obtained from many heterogeneous sources (e.g., relational databases, structured files (e.g., standards-based, regulated and unregulated, etc.), event streams, etc.) and loaded into a target system. Extract, transform, load (ETL) processes extract the data from a source system, transform the data for compatibility with a target data model, and load the transformed data into a target system. The transformation of the data is complicated and requires data analyst/science skillsets to accurately map the origin data model of the source system to the target data model of the target system.

The data transformation of an extract, transform, load (ETL) process is rarely simple to define. The more complicated the origin or source data, the more complicated the transformation. In addition, the complexity of the transformation increases as incongruity expands between the source data model and the target data model.

Typically, Structured Query Language (SQL) may be used to simplify defining and testing the transformation. Tools have been developed around making the transformation process easier and more user friendly, and include products such as MICROSOFT SQL Server Integration Services, INFORMATICA, and parts of the IBM Information Server offering. A fundamental portion of these products is the manner in which the transformation from the source to target data model is defined. Some of these tools use a graphical user interface or have a 'toolbox' of well known transforms that can be applied to the data. After the transformation is defined, the transformation is interpreted at runtime, or is compiled into machine code and executed to accomplish the transformation.

SUMMARY

According to one embodiment of the present invention, a system transfers data between a source system and a target system, and comprises at least one processor. The system receives a module including procedural logic for transforming source data of a source data model to a target data model to produce one or more target data objects for the target data model. The procedural logic is expressed by one or more elements of a domain specific language implemented by an underlying computer language. The one or more elements define mappings and structure for the one or more target data objects. The module is executed to produce the one or more target data objects for loading in the target system in accordance with the mappings and structure defined within the procedural logic by the one or more elements. Embodiments of the present invention further include a method and computer program product for transferring data between a source system and a target system in substantially the same manner described above.

BRIEF DESCRIPTION OF THE DRAWINGS

Generally, like reference numerals in the various figures are utilized to designate like components.

FIG. 6D is an example of a transformation for source data implemented by a domain specific language (DSL) according to an embodiment of the present invention.

DETAILED DESCRIPTION

Figure 1:
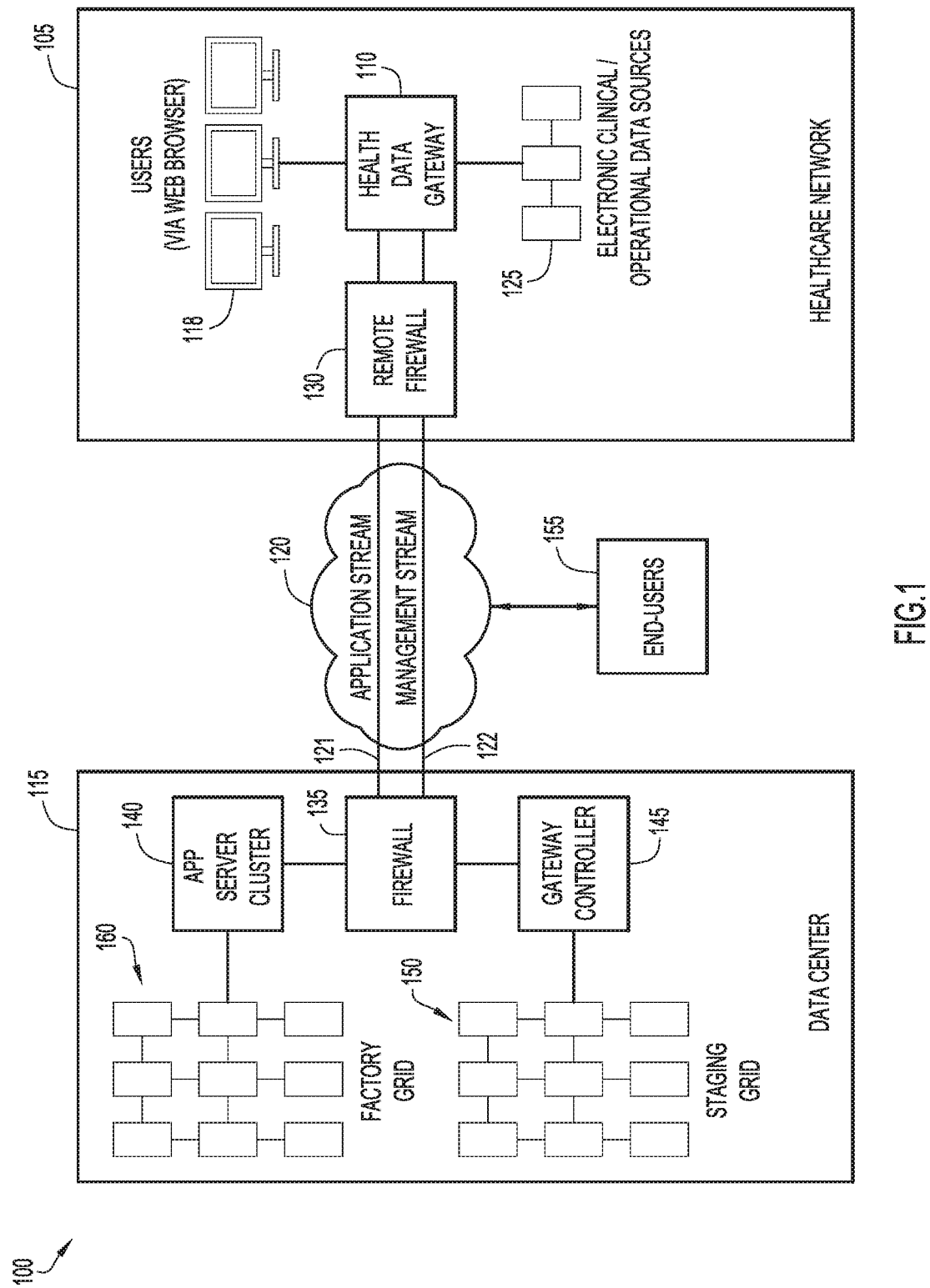
FIG. 1 is a diagrammatic illustration of an example computing environment according to an embodiment of the present invention.

Present invention embodiments simplify defining and executing transformations for converting data from a source data model to a target data model. This may be utilized for extract, transform, load (ETL) or other processes. A present invention embodiment defines a domain specific language (DSL) for the purpose of mapping from a source data model to a target data model. The DSL of present invention embodiments is an internal DSL that utilizes capabilities of an underlying computer language to execute functions in the context of a dynamically defined data structure. By way of example, the DSL is implemented utilizing the Ruby programming language as the underlying computer language. However, other programming languages may be utilized as the underlying computer language for the DSL.

The domain specific language (DSL) of present invention embodiments includes functionality to map a value from a source data structure to a target data structure, iterate over multiple values, explore nested data structures, choose among multiple given inputs, etc. The DSL provides data analysts/scientists the ability to define a transformation from a source data system to a target data system in a manner that promotes ease of understanding, quick feedback, and a common understanding of the transformation.

The domain specific language (DSL) of present invention embodiments is easy to read and comprehendible to those without a strong technical background. The DSL utilizes nomenclature common in the data transformation field, and empowers keywords of the nomenclature to perform the functions described by those keywords. The DSL further utilizes the built-in functionality of the underlying (e.g., Ruby) computer language which can be adjusted (e.g., add or remove functionality) as needed. Since the DSL is easy to read and flexible, users can develop transformation definitions quickly and iteratively.

Since the underlying computer (e.g., Ruby) language for the domain specific language (DSL) is an interpreted language, present invention embodiments provide a technique to quickly test a DSL transformation definition. A user may specify a set of sample data, execute the transformation definition, and view the data in a target data model. This process provides an extremely short feedback loop for users that leads to quick transformation development.

The domain specific language (DSL) of present invention embodiments provides users the ability to define transformation logic that may be used as a transformation of an extract, transform, load (ETL) process to transform data from a source data model to a target data model. The DSL is dynamic in that if an expected source field does not exist, the DSL will default to a known value or the case can be handled separately. Since the DSL approximates natural language, the DSL is easy to read, understand, and share. The DSL is primarily imperative/procedural, thereby providing the grammar a context and mood (substantially similar to a natural language). The DSL further allows scaling the work of defining transformation logic to a wider audience since the DSL does not require a deep background in computer science or programing languages. The DSL transformation definition expects one source model record as input and generates zero or more target model records, thereby allowing scalability from individual source records from event streams/incremental updates to massive historical data sets (e.g., using MapReduce of HADOOP or any other parallel processing framework).

Transformation definitions implemented in the domain specific language (DSL) of a present invention embodiment are valid in a batch processing and event streaming process. The definitions produce zero or more target records for each source record provided as input. Thus, the same transformation definition in batch processing (e.g., on a HADOOP infrastructure) can be used on a record-by-record basis with event streams, such as clinical HL7 admission/discharge/transfer (ADT) messages.

The transformation definition in the domain specific language (DSL) of a present invention embodiment is interpreted at runtime and provides the ability to run in many frameworks. By way of example, a present invention embodiment employs HADOOP MapReduce. The DSL is a procedural language providing a flow of control not available in declarative languages (such as Structured Query Language (SQL), a common choice for extract, transform, load (ETL) processes).

The domain specific language (DSL) of present invention embodiments provides an extremely shortened feedback loop for developing and updating transformation definitions. The underlying interpreted computer language of the DSL does not require compiling the definition before executing on a sample set of data. Accordingly, users are provided with a test of the transformation on sample data with results shown in a very short time.

The domain specific language (DSL) of a present invention embodiment is preferably utilized in a clinical/healthcare data extract, transform, load (ETL) setting, but may be utilized for any other data or settings for processing data.

An example computing environment for use with present invention embodiments is illustrated in FIG. 1. Computing environment 100 includes a healthcare network 105 in communication with a data center 115 over a communications network 120 (e.g., providing a secure virtual private network (VPN)). The communications over network 120 preferably occur between a firewall 130 of healthcare network 105 and a firewall 135 of data center 115. The communications over network 120 may include an application stream 121 pertaining to communications for applications and a management stream 122 pertaining to communications for managing the data. The network may be implemented by any number of any suitable communications media (e.g., wide area network (WAN), local area network (LAN), Internet, Intranet, etc.). Alternatively, healthcare network 105 and data center 115 may be local to each other, and communicate via any appropriate local communication medium (e.g., local area network (LAN), hardwire, wireless link, Intranet, etc.).

Healthcare network 105 includes a health data gateway 110 coupled to end-user systems 118 and one or more clinical/operational data sources 125 providing various medical information (e.g., electronic health records (EHR), claims system, lab feed, HL7, patient satisfaction survey, etc.) stored according to a source data model.

Data center 115 includes an application server cluster 140, a gateway controller 145, a staging grid 150, and a factory grid 160. Health data gateway 110 of healthcare network 105 is configured to acquire data from data sources 125 and transmit the acquired data to gateway controller 145 of data center 115. The gateway controller receives the incoming data from the communications network and processes that data to staging grid 150. The staging and factory grids each include a cluster of computer systems to store data and perform parallel processing. By way of example, the staging and factory grids each employ a HADOOP cluster with a HADOOP distributed file system (HDFS).

Staging grid 150 inspects and publishes the data to factory grid 160 in accordance with a data model employed by the factory grid. Factory grid 160 includes various engines to perform desired analytics on the data based on queries received from end-user systems 118 and other end-user systems 155 accessing data center 115 over network 120. The queries are handled in conjunction with application server cluster 140 to produce desired results.

Figure 2:
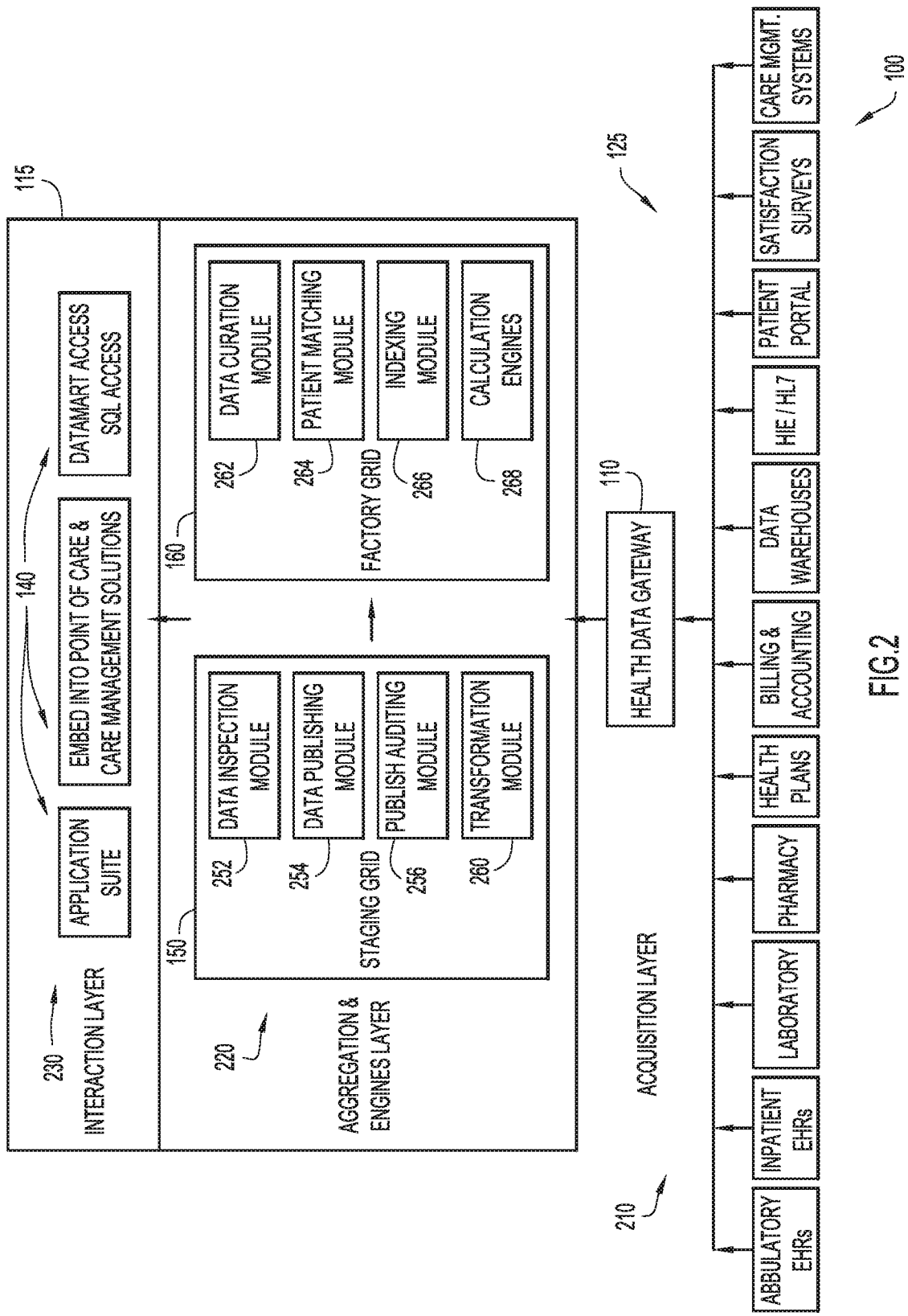
FIG. 2 is a diagrammatic illustration of the data center of the computing environment of FIG. 1 according to an embodiment of the present invention.

Referring to FIG. 2, health data gateway 110 of one or more healthcare networks is configured to acquire data from data sources 125 of those healthcare networks (e.g., ambulatory electronic health records (EHR), inpatient electronic health records (EHR), laboratory data, pharmacy data, health plan data, billing and accounting data, data warehouses, health information exchange (HIE)/HL7 data, patient portal, satisfaction surveys, care management systems, etc.) and transmit the acquired data to gateway controller 145 of data center 115 as described above. The healthcare networks and/or data sources 125 form an acquisition layer 210 providing data to data center 115 via health data gateway 110.

Gateway controller 145 receives the incoming data from communications network 120 and processes that data to staging grid 150 employing data models of the source systems. Staging grid 150 includes a data inspection module 252, a data publishing module 254, and a publish auditing module 256 to inspect, publish, and audit the data to factory grid 160 in accordance with the data model employed by the factory grid. The staging grid further includes a transformation module 260 to implement a domain specific language (DSL) of present invention embodiments for defining and performing transformations of the data between the different data models of the staging and factory grids.

Factory grid 160 includes a data curation module 262, a patient matching module 264, an indexing module 266, and various calculation/analytic engines 268. Data curation module 262 performs data curation operations including mapping codes, data cleansing, and standardization, while patient matching module 264 performs patient matching operations to determine records associated with the same patient. Indexing module 266 performs indexing operations including combining records based on patient matching, mappings, and application of risk models. The calculation/analytic engines perform the desired analytics based on queries received from end-users from an interaction layer 230 enabling application server cluster 140 to provide various applications for processing and accessing the data (e.g., analytic applications, SQL access, etc.). The staging and factory grids form an aggregation and engines layer 220 to process the acquired data, while the queries are handled by factory grid 160 in conjunction with application server cluster 140 to produce desired results for the interaction layer.

The various applications of applications server cluster 140 may be provided in a cloud environment. It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly release to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

Figure 3:
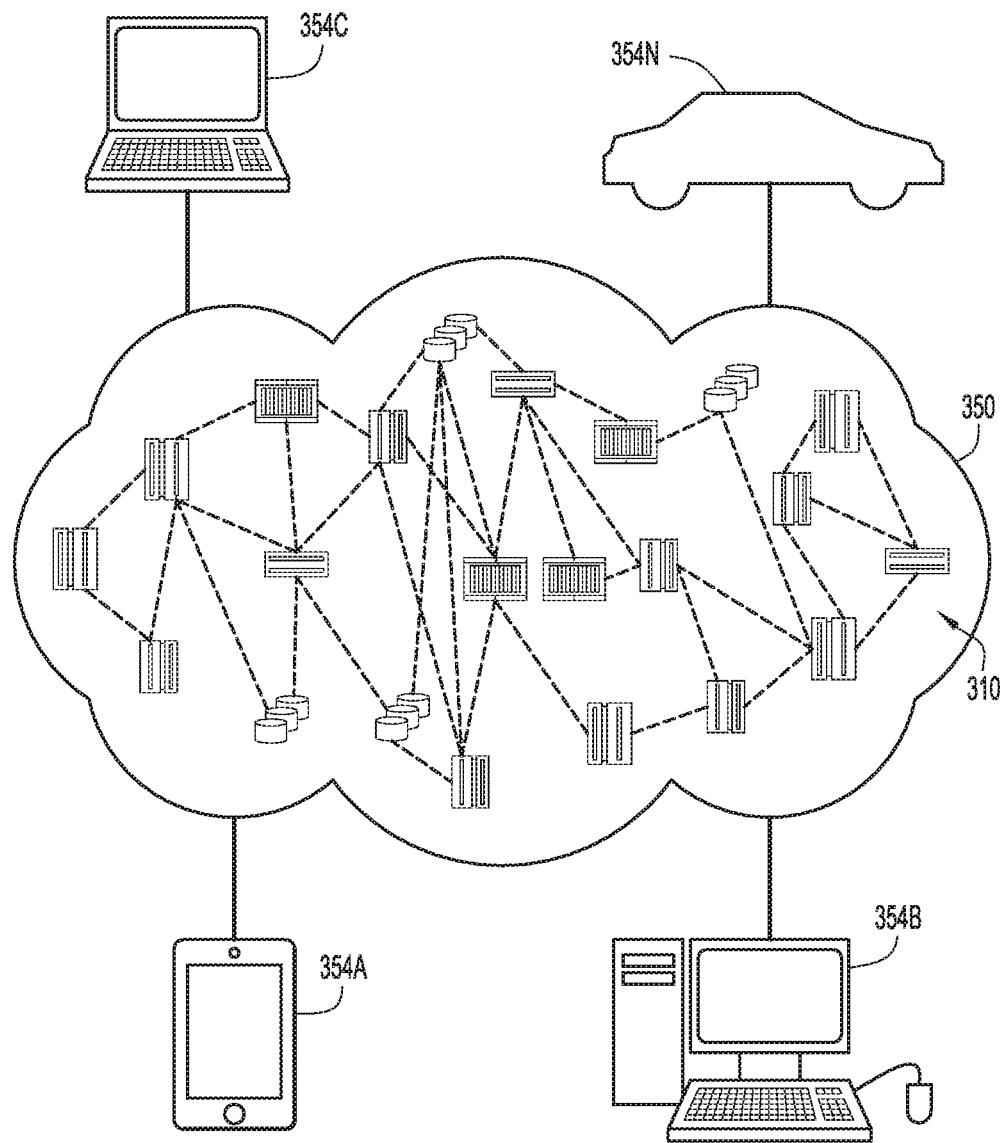
FIG. 3 is a diagrammatic illustration of an example cloud computing environment for the computing environment of FIG. 1 according to an embodiment of the present invention.

A cloud computing environment is service oriented with a focus on statelessness, low coupling, modularity, and semantic interoperability. At the heart of cloud computing is an infrastructure comprising a network of interconnected nodes. Referring now to FIG. 3, illustrative cloud computing environment 350 is depicted. As shown, cloud computing environment 350 comprises one or more cloud computing nodes 310 with which local computing devices used by cloud consumers, such as, for example, personal digital assistant (PDA) or cellular telephone 354A, desktop computer 354B, laptop computer 354C, and/or automobile computer system 354N may communicate. Nodes 310 may communicate with one another. They may be grouped (not shown) physically or virtually, in one or more networks, such as Private, Community, Public, or Hybrid clouds as described hereinabove, or a combination thereof. This allows cloud computing environment 350 to offer infrastructure, platforms and/or software as services for which a cloud consumer does not need to maintain resources on a local computing device. It is understood that the types of computing devices 354A-N shown in FIG. 3 are intended to be illustrative only and that computing nodes 310 and cloud computing environment 350 can communicate with any type of computerized device over any type of network and/or network addressable connection (e.g., using a web browser).

Figure 4:
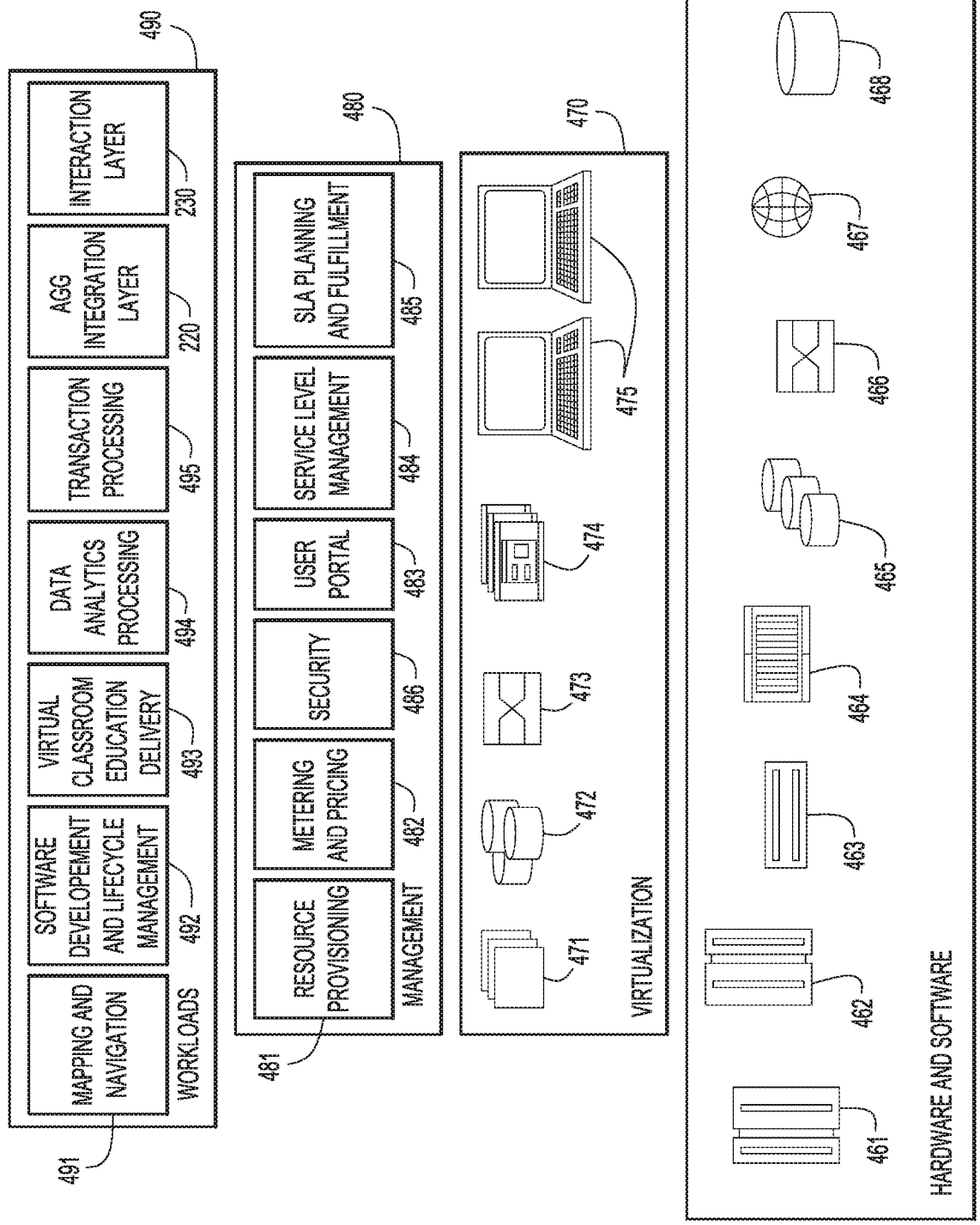
FIG. 4 is a diagrammatic illustration of abstraction model layers according to an embodiment of the present invention.

Referring now to FIG. 4, a set of functional abstraction layers provided by cloud computing environment 350 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 460 includes hardware and software components. Examples of hardware components include: mainframes 461; RISC (Reduced Instruction Set Computer) architecture based servers 462; servers 463; blade servers 464; storage devices 465; and networks and networking components 466. In some embodiments, software components include network application server software 467 and database software 468.

Virtualization layer 470 provides an abstraction layer from which the following examples of virtual entities may be provided: virtual servers 471; virtual storage 472; virtual networks 473, including virtual private networks; virtual applications and operating systems 474; and virtual clients 475.

In one example embodiment, management layer 480 may provide some or all of the functions for data center 115 described herein. Resource provisioning 481 provides dynamic procurement of computing resources and other resources that are utilized to perform tasks within the cloud computing environment. Metering and Pricing 482 provide cost tracking as resources are utilized within the cloud computing environment, and billing or invoicing for consumption of these resources. In one example, these resources may comprise application software licenses. Security 486 provides identity verification for cloud consumers and tasks, as well as protection for data and other resources. User portal 483 provides access to the cloud computing environment for consumers and system administrators. Service level management 484 provides cloud computing resource allocation and management such that required service levels are met. Service Level Agreement (SLA) planning and fulfillment 485 provide pre-arrangement for, and procurement of, cloud computing resources for which a future requirement is anticipated in accordance with an SLA.

Workloads layer 490 provides examples of functionality for which the cloud computing environment may be utilized. Examples of workloads and functions which may be provided from this layer include: mapping and navigation 491; software development and lifecycle management 492; virtual classroom education delivery 493; data analytics processing 494; transaction processing 495; aggregation and engines layer 220 (FIG. 2); and interaction layer 230 (FIG. 2).

Figure 5:
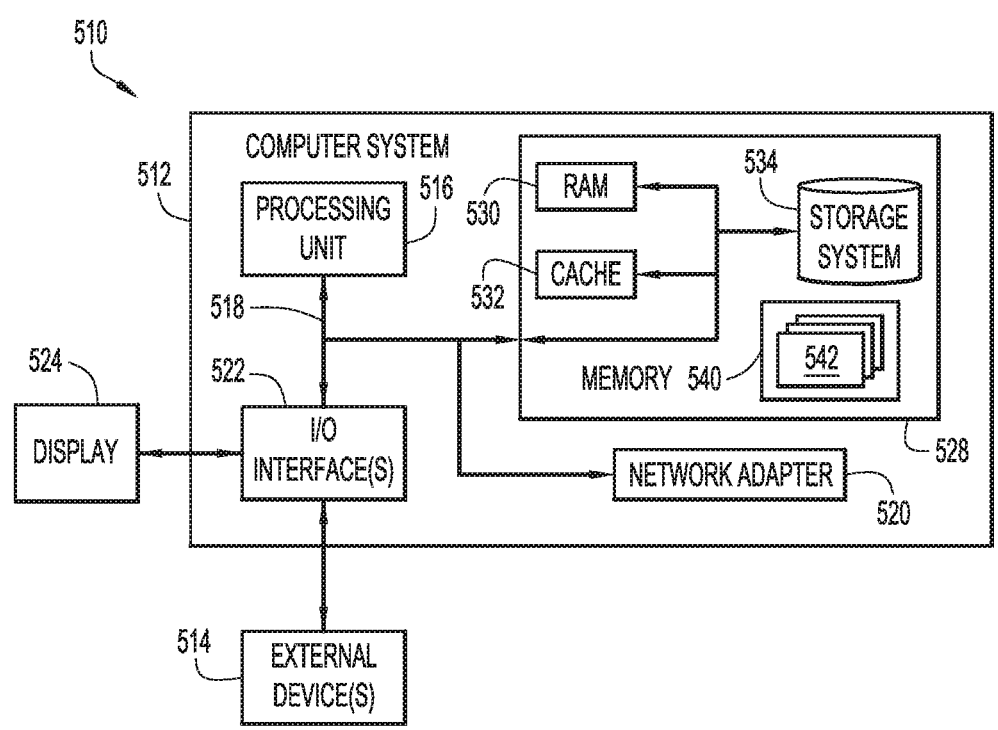
FIG. 5 is a block diagram of a computing node according to an embodiment of the present invention.

Referring now to FIG. 5, a schematic of an example of a computing node or device 510 of computer environment 100 (e.g., health data gateway 110, application server cluster 140, gateway controller 145, computing nodes of staging grid 150, computing nodes of factory grids 160, etc.) and cloud environment 350 (e.g., cloud computing node 310, etc.) is shown. The computing node or device is only one example of a suitable computing node for computing environment 100 and cloud computing environment 350 and is not intended to suggest any limitation as to the scope of use or functionality of embodiments of the invention described herein. Regardless, computing node 510 is capable of being implemented and/or performing any of the functionality set forth herein.

In computing node 510, there is a computer system 512 which is operational with numerous other general purpose or special purpose computing system environments or configurations. Examples of well-known computing systems, environments, and/or configurations that may be suitable for use with computer system 512 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 512 may be described in the general context of computer system executable instructions, such as program modules, being executed by a computer system. Generally, program modules may include routines, programs, objects, components, logic, data structures, and so on that perform particular tasks or implement particular abstract data types. Computer system 512 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system 512 is shown in the form of a general-purpose computing device. The components of computer system 512 may include, but are not limited to, one or more processors or processing units 516, a system memory 528, and a bus 518 that couples various system components including system memory 528 to processor 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 512 typically includes a variety of computer system readable media. Such media may be any available media that is accessible by computer system 512, and it includes both volatile and non-volatile media, removable and non-removable media.

System memory 528 can include computer system readable media in the form of volatile memory, such as random access memory (RAM) 530 and/or cache memory 532. Computer system 512 may further include other removable/non-removable, volatile/non-volatile computer system storage media. By way of example only, storage system 534 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 may include at least one program product having a set (e.g., at least one) of program modules that are configured to carry out the functions of embodiments of the invention.

Program/utility 540, having a set (at least one) of program modules 542, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein.

Computer system 512 may also communicate with one or more external devices 514 such as a keyboard, a pointing device, a display 524, etc.; one or more devices that enable a user to interact with computer system 512; and/or any devices (e.g., network card, modem, etc.) that enable computer system 512 to communicate with one or more other computing devices. Such communication can occur via Input/Output (I/O) interfaces 522. Still yet, computer system 512 can communicate with one or more networks such as a local area network (LAN), a general wide area network (WAN), and/or a public network (e.g., the Internet) via network adapter 520. As depicted, network adapter 520 communicates with the other components of computer system 512 via bus 518. It should be understood that although not shown, other hardware and/or software components could be used in conjunction with computer system 512. Examples, include, but are not limited to: microcode, device drivers, redundant processing units, external disk drive arrays, RAID systems, tape drives, and data archival storage systems, etc.

A set of data in a source data model, layout, or structure of a source system is to be transformed into data compatible with, and for loading into, a target data model, layout or structure of a target system. For example, the data within data models of staging grid 150 are to be transformed to the data model employed by factory grid 160 in data center 115 as described above. The source data models of staging grid 150 preferably contain structured data. By way of example, staging grid 150 utilizes APACHE AVRO for structured data input that provides the schema for the source data. However, present invention embodiments may be utilized with any structured and/or unstructured data.

The domain specific language (DSL) of present invention embodiments provides language tokens to define the logic of a DSL transformation definition (or publisher) to transform the data from the source data model to the target data model.

The domain specific language (DSL) of present invention embodiments includes various elements (e.g., constructs or blocks, statements (e.g., various expressions, commands, calls, functions, logic, declarations, etc.), etc.) specific to the DSL to define the logic to perform the transformation as described below. The DSL is implemented by an underlying computer language module of transformation module 260 of staging grid 150 that interprets and executes the DSL blocks and statements to perform the specified transformation.

The DSL specific blocks and statements for defining the transformation logic (e.g., domain block, record block, create block, map statement, lookup statement, choose block, explore block, group block, etc.) are not built into or pre-defined within the underlying computer language. The computer language module contains functional code (e.g., methods, procedures, etc.) that interprets the DSL transformation definition (or publisher) and performs the specified operations (e.g., including the operations specified by the DSL specific blocks and statements).

In addition, the DSL transformation definition (or publisher) may include actual constructs (or blocks), statements (e.g., various expressions, commands, calls, functions, logic, declarations, etc.), and/or functionality of the underlying computer language that may be executed from the DSL transformation definition (via the computer language module). The actual constructs and statements from the underlying computer language may reside within or independently of the DSL specific constructs and statements contained in the DSL transformation definition. By way of example, the underlying computer language includes the Ruby programming language, where the DSL definition or publisher may employ actual constructs, statements, and/or functionality of the Ruby programming language (within or independent of the DSL specific constructs and statements) to perform the transformation.

A transformation definition or publisher of the domain specific language (DSL) of present invention embodiments receives as input one source data record of a source data model and produces (or publishes) zero or more records for a target data model based on the specified transformation. DSL specific blocks and statements (e.g., publisher statement, record block, create block, map statement, etc.) for creating target records are illustrated by way of example, in FIG. 6A. An example DSL transformation definition or publisher 600a includes a publisher statement 605, a record block 620, a create block 630, and one or more map statements 632. Publisher statement 605 includes, by way of example, a syntax of "Publisher.create do", and specifies the beginning of a transformation definition in the domain specific language (DSL).

Record block 620 includes a record statement 622, a code section 625, and an end statement to terminate the record block. Record block 620 defines the target record for the target data model to be created using the logic defined within code section 625 (and create block 630 described below). The code section may include any desired blocks and/or statements specific to the domain specific language (DSL) and/or from the underlying computer language to define logic for producing the target record.

Record statement 622 defines the start of the record structure. The record statement includes, by way of example, a syntax of "record [record name] do" to specify (e.g., as the [record name]) the name of the target record (e.g., "Observation"). Code section 625 defines the logic to create the target record. By way of example, code section 625 includes a create block 630 that includes a create statement 631, a code section 635, and an end statement to terminate the create block. By way of example, code section 635 includes one or more map statements 632. The create block indicates that a new target record of the defined type is to be created. Code section 635 may include any desired blocks and/or statements specific to the domain specific language (DSL) and/or from the underlying computer language to define logic for producing the target record.

Create statement 631 defines the start of the create block, and includes, by way of example, a syntax of "create do". Map statement 632 includes, by way of example, a syntax of "map [value]=>:[target field name], and indicates that the specified value in the statement (e.g., [value]) is to be used as the value for the specified target field in the statement (e.g., [target field name]) of the target data model. The specified value or expression can be any blocks and/or statements specific to the domain specific language (DSL) and/or from the Ruby or other underlying computer language, including strings, integers, functions, conditional statements, etc.

The specified value in the map statement (e.g., [value]) may also indicate values within the source data model. This may be represented by the name of the identifier for that source data in the source data model preceded by an "@" symbol ("at symbol") (e.g., @id, @person_id, etc. as viewed in FIG. 6A). Thus, map statement 632 provides a mapping for data from the source data model to the target data model.

The target field name in the map statement (e.g., [target field name]) indicates the target field of the target data model for the specified field or value (e.g., [value]). This may be represented by the name of the identifier for that target field in the target data model preceded by an ":" symbol ("colon symbol") (e.g., :RECORD_ID, :PAT_ID, etc. as viewed in FIG. 6A). Target fields are defined in a library available to users, and are used at runtime to place the specified value into the correct field of the target data model. Thus, the record and create blocks create a target record from a source record with the specified fields (e.g., target record "observation" with fields of RECORD_ID, PAT_ID, OBSERVATION_CODE, OBSERVATION_VALUE, and OBSERVATION_DATE).

Figure 6A:
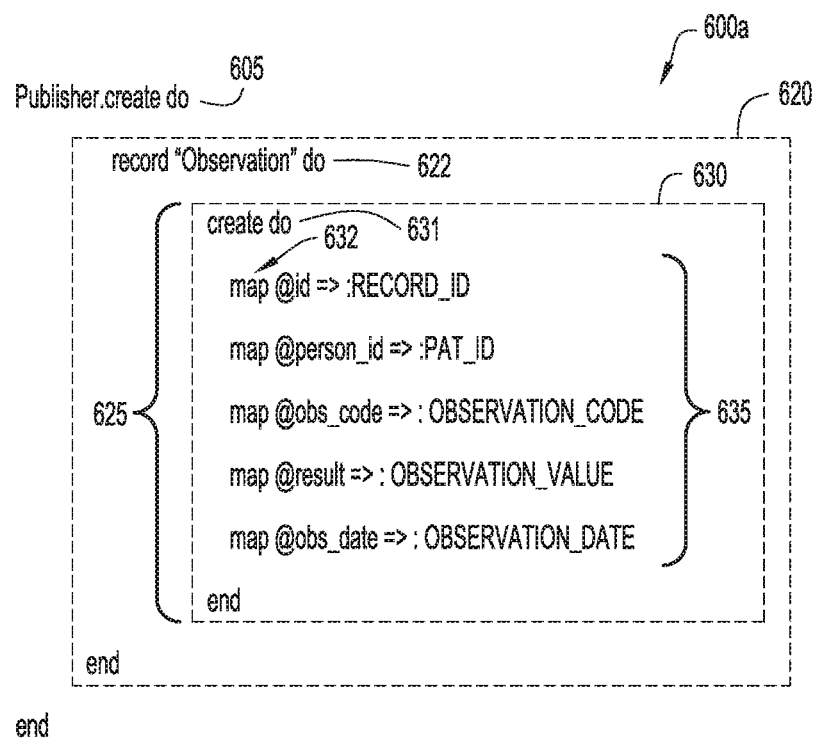
FIG. 6A is an example of a transformation implemented by a domain specific language (DSL) according to an embodiment of the present invention for creating a target record from a source record.

The example publisher of FIG. 6A basically maps extracted source fields into target record fields. The values in the map statements (e.g., represented by @person_id, @obs_code, etc.) are transformed into fields on the target record. For example, publisher 600a forms target data records (e.g., in accordance with record block 620 and create block 630) by mapping data from: source field id to target field RECORD_ID; source field person_id to target field PAT_ID; source field obs_code to target field OBSERVATION_CODE; source field result to target field OBSERVATION_VALUE; and source field obs_date to target field OBSERVATION_DATE.

A record block 620 may include a plurality of create blocks 630 to create more than one target record of that type from the same source record. For example, a target record may be created for each field in a source record (e.g., when each source field represents a different event or object represented by a target record). This is useful for generating multiple target records of the same type when multiple values have been collapsed into the same source record.

Figure 6B:
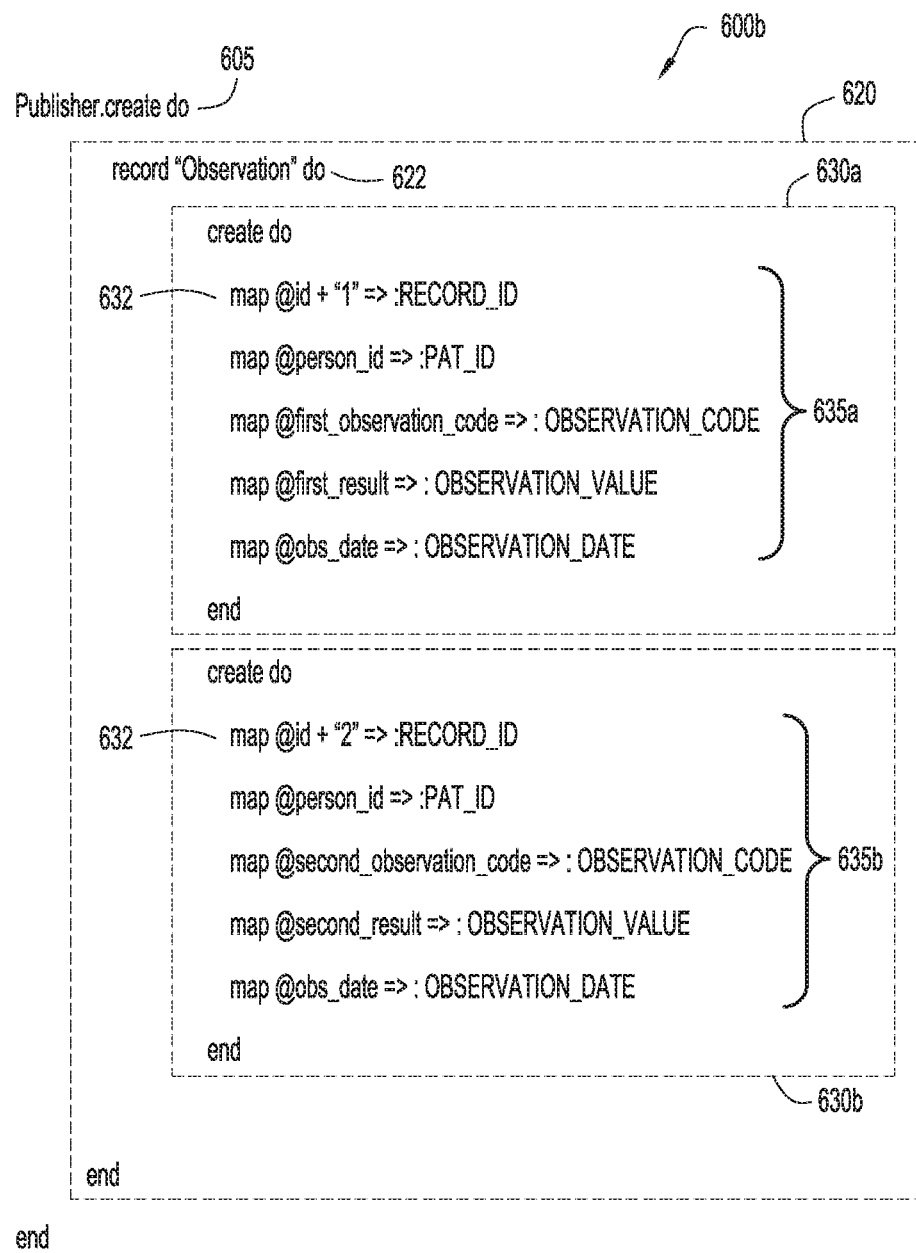
FIG. 6B is an example of a transformation implemented by a domain specific language (DSL) according to an embodiment of the present invention for creating plural target records from a source record.

Referring to FIG. 6B, an example publisher 600b includes record block 620 with create blocks 630a and 630b, each substantially similar to the record and create blocks described above. Record statement 622 defines the start of record block 620 that includes create blocks 630a and 630b each creating a corresponding target record from the same input source record. Code sections 635a, 635b of code blocks 630a, 630b each include one or more map statements 632 to map source record fields to target record fields as described above. Code sections 635a, 635b may include any desired blocks and/or statements specific to the domain specific language (DSL) and/or from the underlying computer language to define logic for producing the target records.

The example publisher of FIG. 6B basically produces two target records from a source record with the specified fields (e.g., two target records "observation" each with fields of RECORD_ID, PAT_ID, OBSERVATION_CODE, OBSERVATION_VALUE, and OBSERVATION_DATE). However, any quantity of create blocks may reside within a record block to construct any quantity of target records.

The values in the map statements of create blocks 630a, 630b (e.g., represented by @person_id, @obs_code, etc.) are transformed into fields on each target record. For example, publisher 600b forms two target data records (e.g., in accordance with record block 620 and create blocks 630a, 630b) from a source record by mapping data from: source field id to target field RECORD_ID; source field person_id to target field PAT_ID; source field obs_code to target field OBSERVATION_CODE; source field result to target field OBSERVATION_VALUE; and source field obs_date to target field OBSERVATION_DATE. In this example case, the two target records each have a different value for the RECORD_ID target field since create block 630a provides RECORD_ID with a source value incremented by one (e.g., map @id+1=>:RECORD_ID) while create block 630b provides RECORD_ID with the same source value incremented by two (map @id+2=>:RECORD_ID).

In addition, a publisher may create target records of different types from the same source record. This is useful when a source record represents more than one type of target record (e.g., a source record includes information for a plurality of different target records). In other words, the data within a source record may span across different target records. For example, source records may include the following structure that includes data spanning across plural target records:

```
{
    "id": "192"
    "person_id": "MRN_ABCD",
```

-continued

```
    "obs_code": "103.4"
    "result": "INCONCLUSIVE"
    "date": "1986/07/01"
    "proc_code": "20348"
    "proc_desc": "CAT Scan"
}
```

Figure 6C:
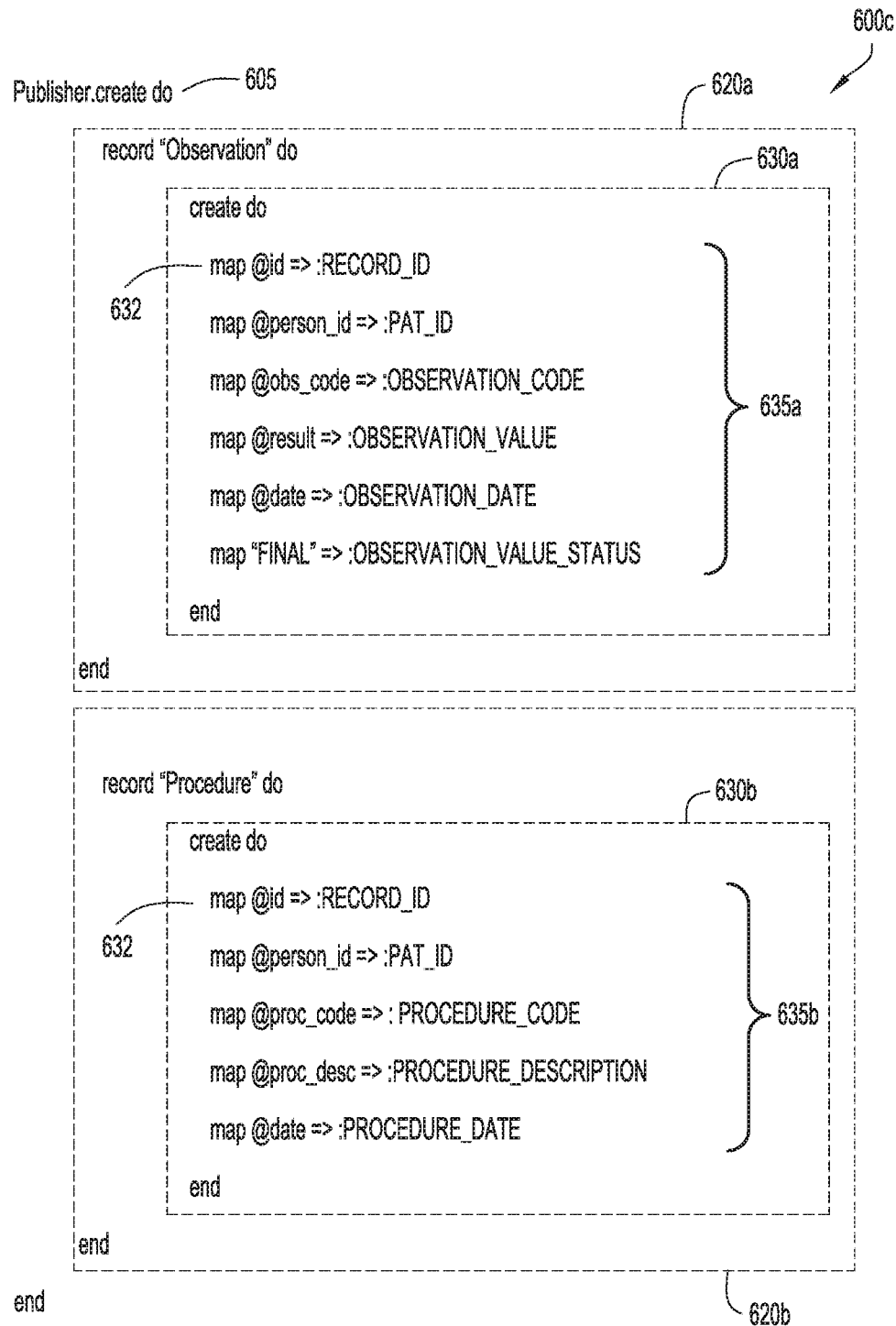
FIG. 6C is an example of a transformation implemented by a domain specific language (DSL) according to an embodiment of the present invention for creating different types of target records from a source record.

A publisher 600c may include plural record blocks 620 to accommodate this source record structure as illustrated, by way of example, in FIG. 6C. In particular, example publisher 600c includes a record block 620a with a create block 630a including map statements 632 to produce a target record (e.g., target record "Observation" with fields of RECORD_ID, PAT_ID, OBSERVATION_CODE, OBSERVATION_VALUE, OBSERVATION_DATE, and OBSERVATION_VALUE_STATUS). The map statements basically map and transform data from: source field id to target field RECORD_ID; source field person_id to target field PAT_ID; source field obs_code to target field OBSERVATION_CODE; source field result to target field OBSERVATION_VALUE; source field date to target field OBSERVATION_DATE; and a literal value of 'FINAL' to target field OBSERVATION_VALUE STATUS).

Since the example source record includes data (e.g., proc_code and proc_desc) spanning to a second target record, publisher 600c further includes a record block 620b including a create block 630b with map statements 632 to produce from the source record a second target record (e.g., target record "Procedure" with fields of RECORD_ID, PAT_ID, PROCEDURE_CODE, PROCEDURE_DESCRIPTION, and PROCEDURE_DATE). The map statements basically map and transform data from: source field id to target field RECORD_ID; source field person_id to target field PAT_ID; source field proc_code to target field PROCEDURE_CODE; source field proc_desc to target field PROCEDURE_DESCRIPTION; and source field date to target field PROCEDURE_DATE.

The example publisher of FIG. 6C basically produces two different target records (e.g., "Observation" and "Procedure") from the same source record to accommodate data within the source record that spans across different target records. However, any quantity of record blocks may reside within a publisher to construct any quantity of any types of target records.

Further DSL specific blocks and statements (e.g., domain block, record block with condition, conditional map statement, lookup statement, etc.) are illustrated in FIG. 6D by way of an example DSL transformation definition or publisher. Specifically, publisher 600d includes a publisher statement 605, a domain block 610, a record block 620, a create block 630, a map statement 632, and a lookup statement 634.

Publisher statement 605 specifies the beginning of a transformation definition in the domain specific language (DSL) as described above. Domain block 610 defines and loads a series of domain, lookup, or reference data (e.g., data that is not considered factual about an entity (e.g., patient, provider, etc.), but is considered a translation from a numerical or non-human-readable code to a human-readable code). The domain block includes a domain element 612, a key element 614, a source element 616, and an end statement to terminate the domain block. The domain element includes, by way of example, a syntax of "domain [domain name]" to specify (e.g., as the [domain name]) the source domain for retrieving the data. The key element includes, by way of example, a syntax of "key [key name]" to specify (e.g., as the [key name]) the key field of a source data object for retrieving the source data. The source element includes, by way of example, a syntax of "source [source name]" to specify (e.g., as the [source name]) the source data object for retrieving the source data.

Record block 620 includes record statement 622, code section 625, and an end statement to terminate the record block, each substantially similar to the corresponding items described above. Record block 620 defines the target record (e.g., 'Encounter') for the target data model to be created using the logic defined within code section 625. The code section may include any desired blocks and/or statements specific to the domain specific language (DSL) and/or from the underlying computer language to define logic for producing the target record.

Record statement 622 defines the start of the record structure as described above, and may further include a condition. The record statement includes, by way of example, a syntax of "record [record name] do [condition]" to specify (e.g., as the [record name]) the name of the target record and (e.g., as the [condition]) a condition to terminate generation of further target records. In this example case, the target records are constructed (based on the code within the record and create blocks) until a source patient identification field (e.g., patientuid) is null. However, any desired condition or record name may be utilized. In addition, the condition may be expressed using any desired blocks and/or statements specific to the domain specific language (DSL) and/or from the underlying computer language.

Code section 625 defines the logic to create the target record. By way of example, code section 625 includes a create block 630 that includes a create statement 631 and a code section 635, each substantially similar to the corresponding items described above. By way of example, code section 635 includes one or more map statements 632. The map statements may further include a lookup statement 634. The create block indicates that a new target record of the defined type is to be created (e.g., target record 'Encounter' with fields of RECORD_ID, UPDATE_DATE, EHR_SYSTEM_ID_QUALIFIER, PAT_ID, ENCOUNTER_ID, ENCOUNTER_DATE, ENCOUNTER_TYPE, ENCOUNTER_STATUS, ENCOUNTER_LOCATION_ID, ENCOUNTER_PRIMARY_CARE_PROVIDER, and ENCOUNTER_REFERRING_PROVIDER). Code section 635 may include any desired blocks and/or statements specific to the domain specific language (DSL) and/or from the underlying computer language to define logic for producing the target record.

Create statement 631 defines the start of the create block as described above. Map statement 632 is substantially similar to the map statement described above, and may further include a condition. The conditional map statement includes, by way of example, a syntax of "map [value]=>: [target field name] [condition or expression], and indicates that the specified value in the statement (e.g., [value]) is to be used as the value for the specified target field in the statement (e.g., [target field name]) of the target data model. This mapping may be based on the value or satisfaction of any condition or expression ([condition or expression]) (e.g., the mapping or data placement occurs in response to the condition being satisfied). The specified value, condition, or expression can be any blocks and/or statements specific to the domain specific language (DSL) and/or from the Ruby or other underlying computer language, including strings, integers, functions, conditional statements, etc.

Lookup statement 634 includes, by way of example, a syntax of "lookup ([domain], [key], [field])", and indicates that the transformation requires referencing domain data. The lookup statement is in the form of a function call, and includes arguments specifying a domain name (e.g., as [domain]) and key (e.g., as [key]) (as defined in a domain block 610), and a name of the source field (e.g., as [field]) from which to retrieve the domain data.

The example publisher of FIG. 6D basically declares source fields appointmenttypeuid, appointmentstatusuid, and servicesiteuid as domain data requiring a lookup (e.g., domain blocks 610), and forms target data records (e.g., in accordance with record block 620 and create block 630) by mapping data from: source field appointmentuid to target field RECORD_ID; source field lastmodifieddate to target field UPDATE_DATE; a literal value of "APPOINTMENT" to target field EHR_SYSTEM_ID_QUALIFIER; source field patientuid to target field PAT_ID; source field appointmentuid to target field ENCOUNTER_ID; source field startdatetime to target field ENCOUNTER_DATE; source field providercaretypeuid to target field ENCOUNTER_PRIMARY_CARE PROVIDER based on the result of the condition (e.g., the mapping occurs when the value of source field providercaretypeuid is equal to "123"); and source field referredbyprovideruid to target field ENCOUNTER_REFERRING_PROVIDER.

In addition, the example publisher of FIG. 6D further forms the target records by looking up and mapping: the human-readable value of source field appointmenttypeuid to target field ENCOUNTER_TYPE; the human-readable value of source field appointmentstatusuid to target field ENCOUNTER_STATUS; and the human-readable value of source field servicesiteuid to target field ENCOUNTER_LOCATION_ID.

Figure 7:
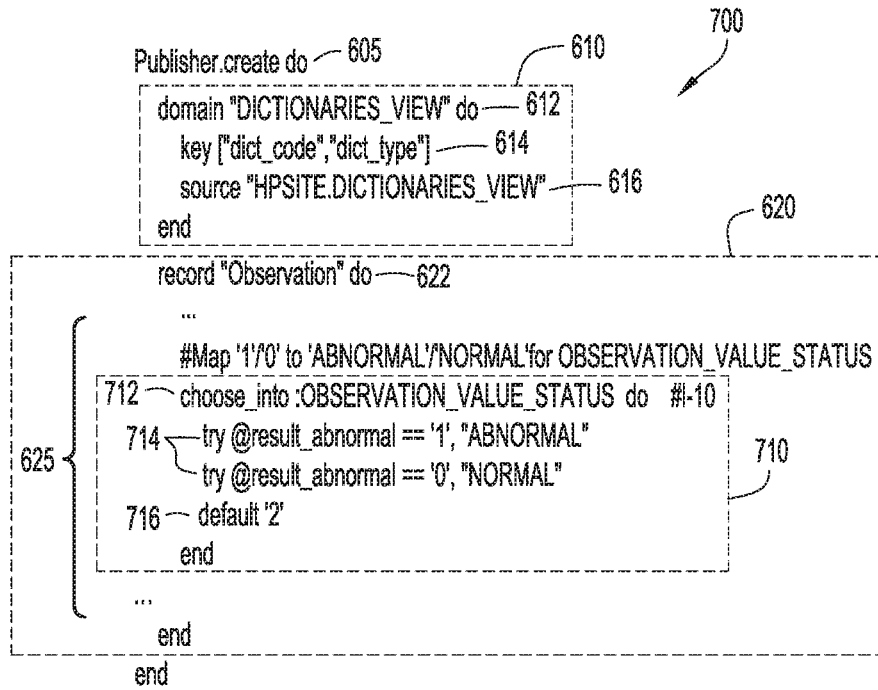
FIG. 7 is an example of a transformation implemented by a domain specific language (DSL) according to an embodiment of the present invention for source data with a composite key.

Several extended and/or additional blocks and statements (e.g., choose block, etc.) specific to the domain specific language (DSL) of present invention embodiments are illustrated in FIG. 7 by way of an example transformation definition or publisher 700. In this case, publisher 700 accommodates domain data with keys constructed of a plurality of fields and enables selection from among plural source data values. Specifically, publisher 700 includes publisher statement 605, domain block 610, and record block 620, each substantially similar to the corresponding items described above.

Publisher statement 605 specifies the beginning of a transformation definition in the domain specific language (DSL) as described above. Domain block 610 defines and loads a series of domain, lookup, or reference data as described above, and includes domain element 612, key element 614, source element 616, and an end statement to terminate the domain block. Key element 614 is expanded and includes, by way of example, a syntax of "key [key name 1, . . . , key name N]" to accommodate plural fields constructing the key (e.g., a quantity of N fields constructing a key, where N is an integer and N>1), and specify (e.g., as [key name 1, . . . , key name N]) the fields of a source data object constructing the key for retrieving the source data. The domain block basically defines a domain where the reference data is indexed using a key constructed of plural fields.

Record block 620 includes record statement 622 and code section 625 (e.g., to define a target record 'Observation' with an OBSERVATION_VALUE_STATUS field). By way of example, the code section includes a choose block 710. However, the code section may include any desired blocks and/or statements specific to the domain specific language (DSL) and/or from the underlying computer language to define logic for producing the target record.

Record statement 622 defines the start of the record block as described above. Choose block 710 is utilized to provide logic for selecting the value for the desired target field. Choose block 710 includes a choose statement 712, a try statement 714, a default statement 716, and an end statement to terminate the choose block. Choose statement 712 includes, by way of example, a syntax of "choose_ into :[target field name] do". The target field name (e.g., [target field name]) specifies the target field to receive the data.

Try statement 714 includes, by way of example, a syntax of "try [condition], [value]" and specifies the condition (e.g., [condition]) to be satisfied in order for the specified value (e.g., [value]) to be selected for the target field. In this example case, the respective try statements compare the value of the source field result abnormal to values of '1' and '0'. The try statements select "ABNORMAL" for the target field when a '1' is present in the source field, while "NORMAL" is selected for the target field when a '0' is present in the source field. The conditions for the try statements may include any desired blocks and/or statements specific to the domain specific language (DSL) and/or from the underlying computer language.

Default statement 716 includes, by way of example, a syntax of "default [value]" and is utilized when the conditions of the try statements are not satisfied (e.g., the source field result abnormal does not equal '1' or '0' as viewed in FIG. 7). In this case, the specified value (e.g., [value]) is placed in the target field (e.g., a '2' as viewed in FIG. 7).

In other words, the choose block provides logic that produces a result to be mapped into the specified target field. The try statements of the choose block are executed sequentially. When a try statement returns a non-false value (e.g., satisfies the specified condition), the specified value of that try statement is selected for the target field. When no conditions of the try statements are satisfied, the value specified in the default statement is utilized for the target field. Thus, the choose block may provide a transformation or mappings for different values denoting a similar indication.

Figure 8:
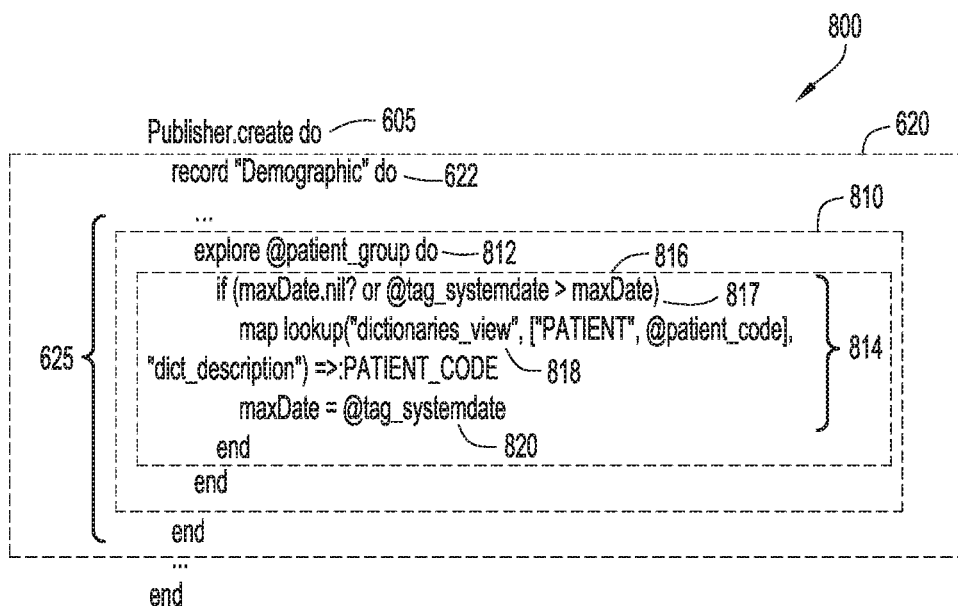
FIG. 8 is an example of a transformation implemented by a domain specific language (DSL) according to an embodiment of the present invention for a nested data structure of the source data.

Other blocks and/or statements (e.g., explore block, etc.) specific to the domain specific language (DSL) of present invention embodiments are illustrated in FIG. 8 by way of an example transformation definition or publisher 800. In this case, publisher 800 accommodates nested structures in the source data containing zero or more records, and uses a token to iterate over those records to map or transform the data. Specifically, publisher 800 includes publisher statement 605 and record block 620, each substantially similar to the corresponding items described above.

Publisher statement 605 specifies the beginning of a transformation definition in the domain specific language (DSL) as described above. Record structure 620 includes record statement 622 and code section 625 (e.g., to define a target record 'Demographic' with a PATIENT_CODE field). By way of example, code section 625 includes an explore block 810. However, the code section may include any desired blocks and/or statements specific to the DSL and/or from the underlying computer language to define logic for producing the target record.

Record statement 622 defines the start of the record block as described above. Explore block 810 is utilized to provide logic for traversing nested structures in the source data and mapping appropriate values in the nested structure to the desired target field. In this example case, explore block 810 traverses a nested source structure patient_group (e.g., containing zero or more source records) to map values from those nested source records to target field PATIENT_CODE.

Explore block 810 includes an explore statement 812, a code section 814 to receive statements specifying logic for the mapping, and an end statement to terminate the explore block. In this example case, code section 814 includes a conditional block 816 with a map statement 818, and a variable or token assignment statement 820 assigning a value to a variable or token (e.g., maxDate as viewed in FIG. 8). However, the code section may include any desired blocks and/or statements specific to the domain specific language (DSL) and/or from the underlying computer language to define logic for producing the target record.

Explore statement 812 includes, by way of example, a syntax of "explore [source structure name] do". The source structure name in the explore statement (e.g., [source structure name]) specifies the source structure to traverse. Conditional block 816 includes a conditional statement 817 (e.g., if statement, etc.) and map statement 818 which is executed upon satisfaction of the condition (e.g., comparison of dates to the variable or token as viewed in FIG. 8). The conditional block and assignment statement are typically elements from the underlying computer language. Map statement 818 is substantially similar to map and lookup statements 632, 634 described above. The map statement retrieves reference data (e.g., human-readable value) from a specified domain (e.g., dictionaries_view) based on the specified composite key (e.g., PATIENT and value of the source patient_code field) and specified source field (e.g., dict_description), and maps the data to the specified target field (e.g., PATIENT_CODE). In this case, the value is retrieved from dict_description in the source data model in the dictionaries_view domain based on the composite key of PATIENT and the value of the source patient_code field. The reference value is mapped to the target field PATIENT_CODE.

In other words, the explore block indicates that the specified source structure is a nested source structure that contains zero or more records. The data in each record of the nested source structure is made available to the explore block, where the domain specific language (DSL) publisher transforms the values in the source nested fields to the target fields of the target data model.

Figure 9:
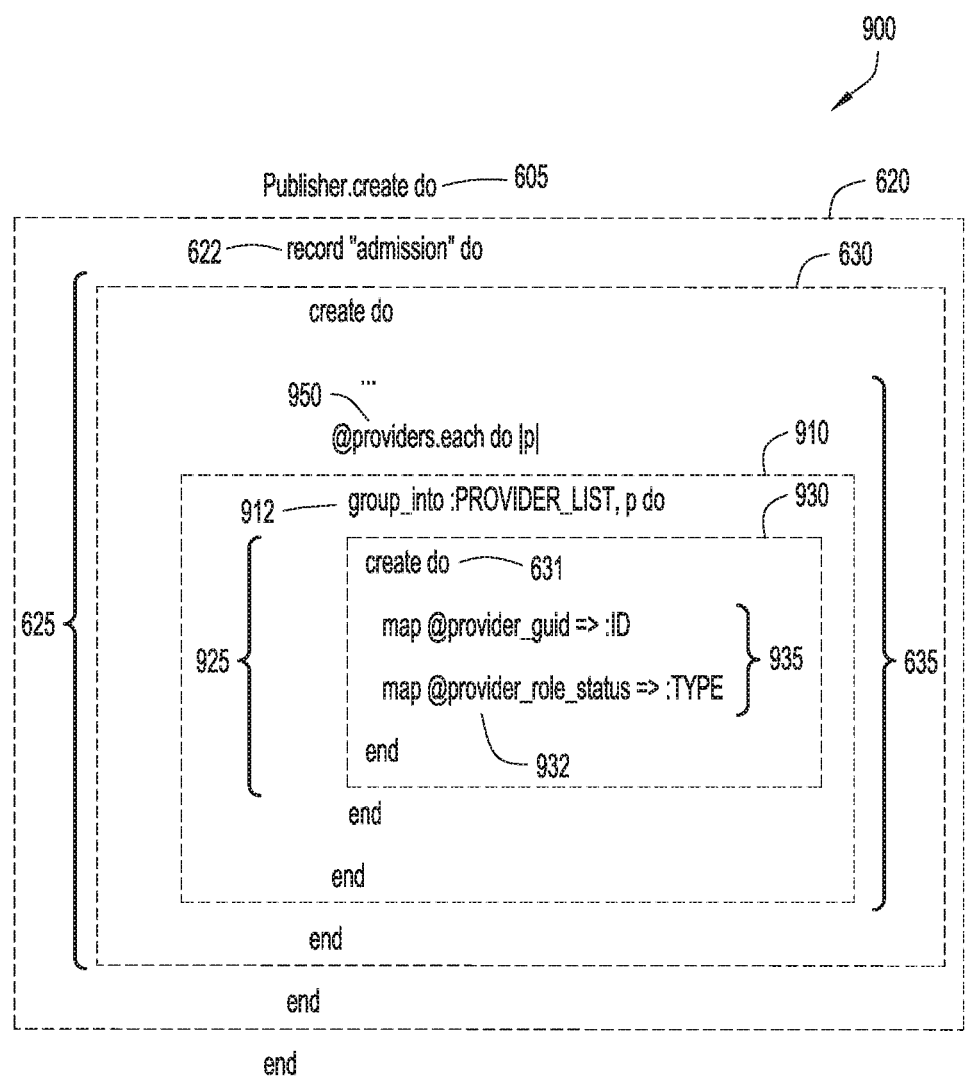
FIG. 9 is an example of a transformation implemented by a domain specific language (DSL) according to an embodiment of the present invention for creating a list of records for a target record field.

Additional blocks and/or statements (e.g., group block, etc.) specific to the domain specific language (DSL) of present invention embodiments are illustrated in FIG. 9 by way of an example transformation definition or publisher 900. In this case, publisher 900 accommodates target records requiring a list of entries in a field instead of a single value. For example with respect to a healthcare environment, a list of providers may be added for an encounter, admission, and/or a procedure. Specifically, publisher 900 includes publisher statement 605, and record block 620 each substantially similar to the corresponding items described above.

Publisher statement 605 specifies the beginning of a transformation definition in the domain specific language (DSL) as described above. Record structure 620 includes record statement 622 and code section 625 including a create block 630 with a code section 635 as described above (e.g., to define a target record 'admission' with fields of ID and TYPE). By way of example, code section 635 includes a group block 910. However, code sections 625, 635 may include any desired blocks and/or statements specific to the DSL and/or from the underlying computer language to define logic for producing the target record list.

Record statement 622 defines the start of the record block, while create statement 631 of create block 630 defines the start of the create block as described above. Group block 910 is utilized to map values into fields of individual nested records within a publisher, where the resulting records are grouped together as a list and mapped into the specified target field. In this example case, group block 910 iterates over a list of nested records that are contained in a source field (e.g., providers) to produce a list of records for a corresponding target field (e.g., PROVIDER_LIST).

Group block 910 includes a group statement 912, a code section 925 to receive statements specifying logic for mapping, and an end statement to terminate the group block. In this example case, code section 925 includes a create block 930 with a code section 935 (substantially similar to create block 630 and code section 635 described above). Code section 935 includes one or more map statements 932 to define the mappings. However, code section 935 may include any desired blocks and/or statements specific to the domain specific language (DSL) and/or from the underlying computer language to define logic for producing the target record list.

Group statement 912 includes, by way of example, a syntax of "group_into :[target field name], [value] do". The target field name in the group statement (e.g., [target field name]) specifies the target field to receive the list defined by create block 930. The value field name in the group statement (e.g., [value]) is a variable containing a single record provided by code section 935. Code section 935 of create block 930 includes a series of map statements 932 which map source fields to the fields of the records in the target record list. Map statement 932 is substantially similar to the map statements 632 described above. The map statements map source fields (e.g., provider_guid and provider_role_status) to corresponding fields (e.g., ID and TYPE) of the records in the target record list.

The group block may be utilized with a loop statement 950 and a corresponding end statement to iterate over the nested source records. The loop statement includes, by way of example, a syntax of "[source field].each do", and corresponds to a method, procedure, and/or function of the underlying computer language to perform the iteration over the nested records (e.g., within the specified [source field]).

In this example case, the source field (e.g., providers) is a list of nested records. Each of the nested records contains a provider_guid field and a provider_role_status field. Loop statement 950 iterates over each nested record in the source list (e.g., providers as the [source field]), and group block 910 groups the values mapped within create block 930 into individual nested records to form the target record list for the specified target field (e.g., PROVIDER_LIST).

Figure 10:
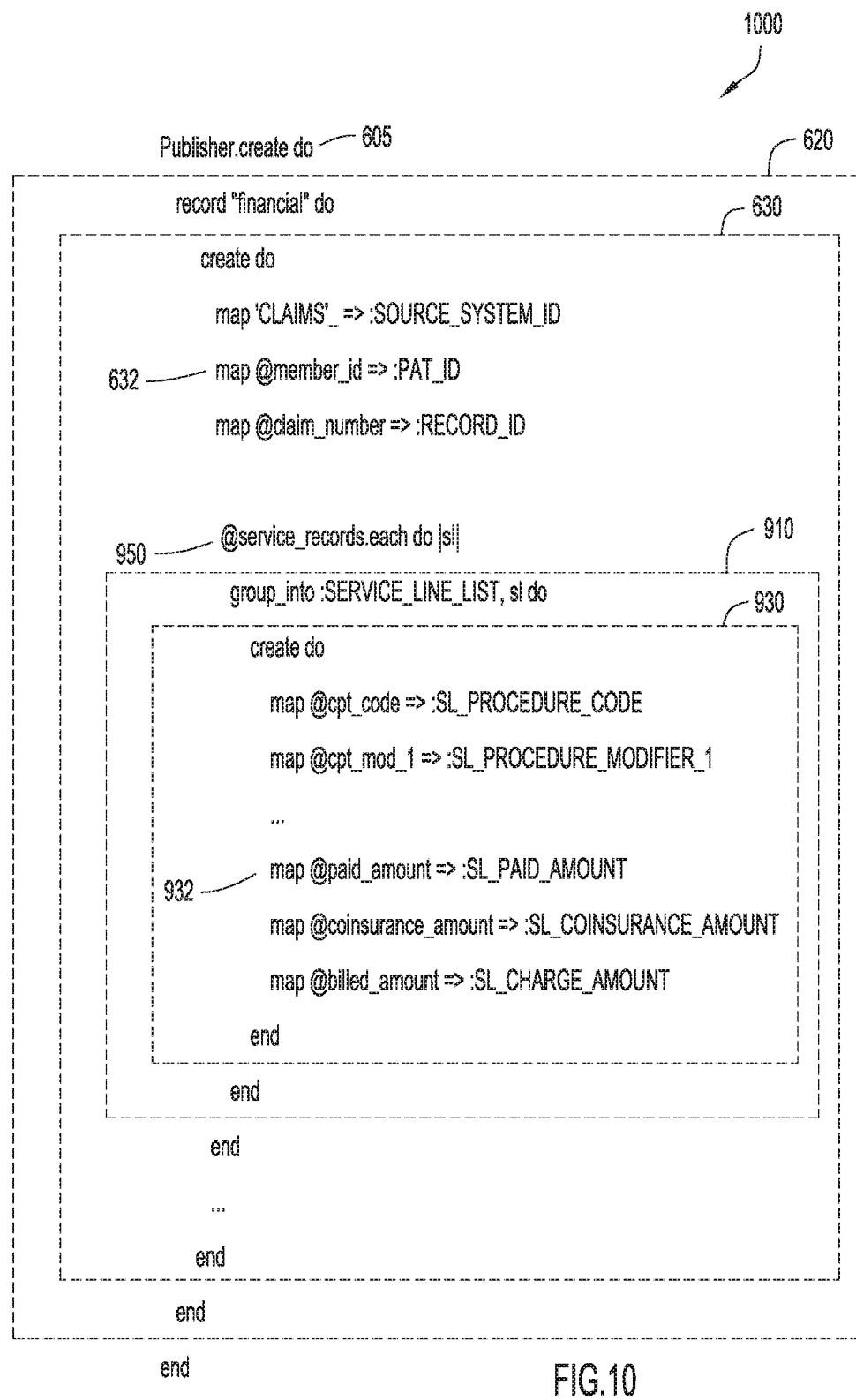
FIG. 10 is another example of a transformation implemented by a domain specific language (DSL) according to an embodiment of the present invention for creating a list of records for a target record field.

Financial records present another example of mapping a list of nested records into a single target field as illustrated in FIG. 10. Specifically, a publisher 1000 includes publisher statement 605, record block 620 (e.g., to define a target record 'financial' with fields of SOURCE_SYSTEM_ID, PAT_ID, RECORD_ID, SERVICE_LINE_LIST, SL_PROCEDURE_CODE, SL_PROCEDURE_MODIFIER_1, SL_PAID_AMOUNT, SL_COINSURANCE_AMOUNT, and SL_CHARGE_AMOUNT), create block 630, loop statement 950, and group block 910, each substantially similar to the corresponding items described above for FIG. 9. Create block 630 maps source fields to target fields with map statements 632 (e.g., the value 'CLAIMS' is mapped to the target field SOURCE_SYSTEM_ID, the source field member_id is mapped to the target field PAT_ID, and the source field claim_number is mapped to the target field RECORD_ID).

Loop statement 950 iterates over each nested record of the designated source field (e.g., service_records) to create a list of target records for the specified target field (e.g., SERVICE_LINE_LIST).

Create block 930 includes a series of map statements 932 to specify the mappings between source fields and the fields for the records in the target record list (e.g., the source field cpt_code is mapped to the target field SL_PROCEDURE_CODE, the source field cpt_mod_1 is mapped to the target field SL_PROCEDURE_MODIFIER_1, the source field paid_amount is mapped to the target field SL_PAID_AMOUNT; the source field coinsurance_amount is mapped to the target field SL_COINSURANCE_AMOUNT; and the source field billed_amount is mapped to the target field SL_CHARGE_AMOUNT).

In this example case, publisher 1000 is iterating over the nested records inside the designated source field (e.g., service_records), where group block 910 represents the creation of a target record that is appended to the list of target records for the specified target field (e.g., SERVICE_LINE_LIST). Source fields specified within create block 930 (e.g., paid_amount, cpt_code, etc.) are mapped according to map statements 932, and the target record for the target record list is created with those values.

Publishers may be reused within staging grid 150 for transformations. Although a large number of independent source systems may be integrated, there may be some overlap with respect to the electronic medical record (EMR) or software that has been previously integrated. In some cases, the exact same publishers may be reused on a new integration, while in other cases adjustments may be needed to accommodate new source system semantics.

Present invention embodiments enable variable substitution within a publisher based on a configuration file associated with the publisher. Thus, a single template publisher may be created and used with more than one instance of a source system (e.g., within or outside the same organization). A configuration file defines the variables and syntax that allows using those variables in a publisher. The syntax is preferably from the YAML computer language. For example, a variable definition may include a syntax of ":VAR_NAME: 'text'", where the variable name (e.g., VAR_NAME) is assigned the corresponding value (e.g., 'text'). A variable list definition may include the syntax of:

":VAR_LIST:
'text1'
'text2'"

where the variable list name (e.g., VAR_LIST) is assigned a list containing the corresponding values (e.g., 'text1' and 'text2'). However, the variable list may include any quantity of values, while the variable and variable lists may contain any type of data (e.g., strings, integers, etc.).

An example structure of the configuration file may be as follows.

---
:VARIABLE_1: 'COMPLETE'
:VARIABLE_2:
'1234'
'5678'
'ABCD'

In this example structure, the string, "---", indicates the beginning of the configuration file, the variable, VARIABLE_1, is set to the string "COMPLETE", and the variable, VARIABLE_2, is set to a list of strings (e.g., ["1234", "5678", "ABCD"]). The configuration file is preferably implemented in YAML, but may be implemented by any language.

An example manner of accessing the variables declared within the configuration file from a publisher includes preceding the variable name with a symbol (e.g., '$'). For example, the map statement:

map $VARIABLE_1=>:ENCOUNTER_STATUS maps the string "COMPLETE" (e.g., assigned to VARIABLE_1 as described above) to the specified target field (e.g., ENCOUNTER_STATUS).

By way of a further example, the conditional block:
if $VARIABLE_2.include @some_field
map "CODE DESCRIPTION"=>:DIAGNOSIS_DESCRIPTION
end maps the specified value (e.g., "CODE DESCRIPTION") into the designated target field (e.g., DIAGNOSIS_DESCRIPTION) in response to the value of the specified source field (e.g., @some_field) residing in the value list for the designated variable (e.g., VARIABLE_2).

The variables and/or variable lists may be utilized to configure a publisher for different systems. By way of example, a publisher may include the following map and lookup statements within record and create blocks (in substantially the same manners described above).

map lookup("location", "Family Doctors", "locationsid")=>:OBSERVATION_LOCATION_ID In this example case, the specified target field (e.g., OBSERVATION_LOCATION_ID) is determined based on a lookup within the specified domain (e.g., "location") from a designated field (e.g., "locationsid") using a hardcoded key value of "Family Doctors".

Since the key is specific to only the corresponding source system, the key needs to be changed when using the publisher for different source systems of the same type. One approach is to duplicate the entire publisher into each source system, and change the key value used for the location domain lookup. This leads to maintainability issues because updates to a single publisher propagate to corresponding updates for every instance of the source system that has been integrated.

However, instead of duplicating the entire publisher and hardcoding the location lookup key, the configuration file can be utilized to define the value to use for the lookup. For example, a variable may be defined (e.g., LOCATION_NAME) within a configuration file to contain the key value (e.g., "Family Doctors" for the initial source system) as follows.

---
:LOCATION_NAME: 'Family Doctors'

When the publisher is configured for use, the configuration file is committed to source control and associated with the publisher. The lookup statement in the publisher may be upgraded to use the variable (instead of the hardcoded location name) as follows.

map lookup("location", $LOCATION_NAME, "locationsid")=>:OBSERVATION_LOCATION_ID

In this example case, the variable (e.g., LOCATION_NAME) is replaced with the assigned value "Family Doctors" when the publisher is executed. Accordingly, this same publisher may be used for all source systems of the same type, regardless of the practice or organization. In order to reuse the publisher, a configuration file for the publisher is associated with each source system to define the value for the key variable (e.g., LOCATION_NAME) corresponding to that source system to be used by the publisher.

Thus, the same publisher may be executed for each source system using the appropriate key value.

Figure 11:
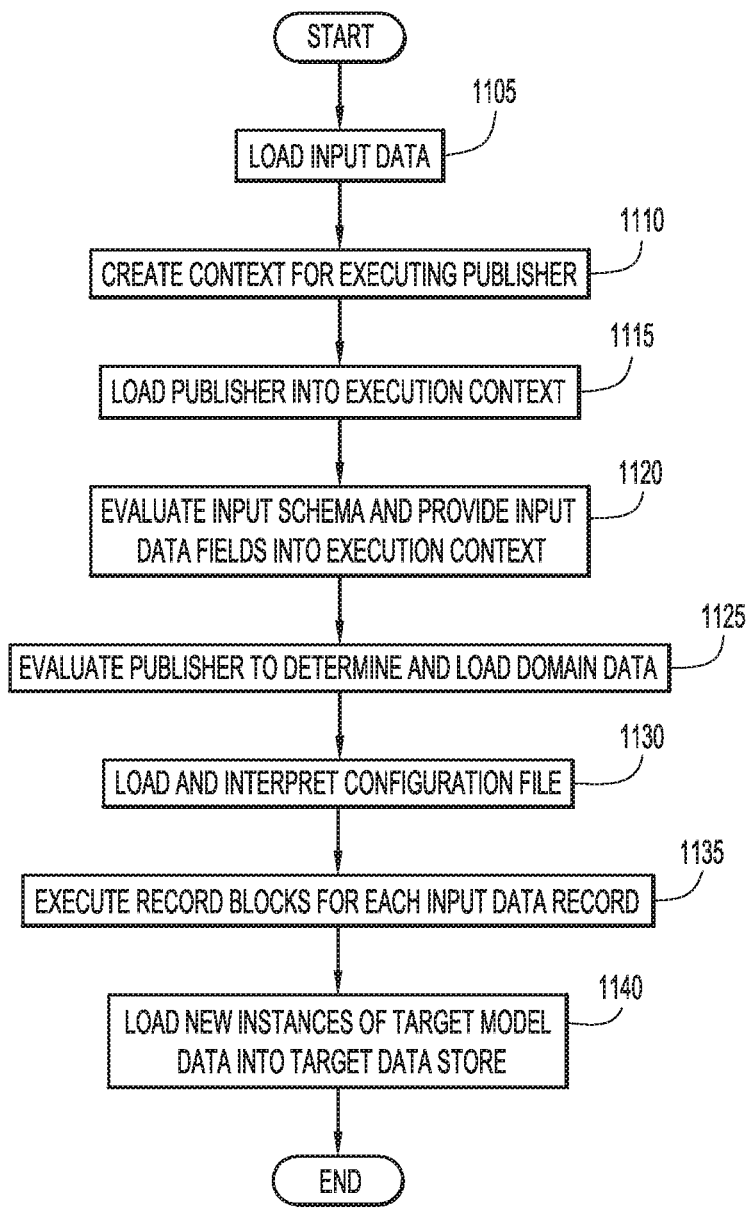
FIG. 11 is a procedural flowchart illustrating a manner of performing a transformation for source data implemented by a domain specific language (DSL) according to an embodiment of the present invention.

A manner of transforming data from a source data model of a source system to a target data model of a target system via a domain specific language (DSL) (e.g., by way of transformation module 260 and staging grid 150) according to an embodiment of the present invention is illustrated in FIG. 11. Initially, a DSL transformation definition or publisher is generated (e.g., by a user or automated tool) to define a transformation between source and target data models. By way of example, data is to be transformed and loaded from staging grid 150 to factory grid 160. However, the publisher may be used to transform and load data between any source and target data models and systems. The generated publisher is committed to a source control (e.g., of staging grid 150) that configures the publisher to be used for a specific source data set. The publisher is loaded and executed in staging grid 150 (e.g., a HADOOP cluster) to achieve the transformation results.

In particular, input data is loaded into a JAVA or other process within staging grid 150 at step 1105. The data may be loaded in bulk, or on an individual record basis. A context is created in staging grid 150 for executing the publisher at step 1110. By way of example, a JAVA or other virtual machine may be implemented (e.g., using a JRuby implementation in the case of an underlying Ruby programming language for the publisher). The generated transformation definition or publisher is loaded into the publisher execution context at step 1115.

The schema of the input data (e.g., provided by APACHE AVRO or other structured or unstructured input data format) is evaluated, and the names or other identifiers of the fields of the input data are injected into the publisher execution context at step 1120, thereby creating the fields that are used during the transformation. For example, these fields may correspond to the fields designated by '@' symbol within the publishers described above.

The publisher is executed by the underlying computer language module of transformation module 260 to perform the operations specified in the publisher. The blocks and statements specific to the domain specific language (DSL) correspond to methods, procedures, and/or functions of the computer language module that provide the logic to perform the operations of these DSL specific blocks and statements described above. Actual blocks or statements within the publisher from the underlying computer language are executed in the execution context in substantially the same manner as the underlying computer language is executed. The results of the actual blocks or statements may be used by other blocks and/or statements within the publisher (specific to the DSL and/or from the underlying computer language).

In particular, the publisher is initially evaluated to determine the domain data to be loaded at step 1125. This information may be ascertained from domain blocks 610 within the publisher. The specified domain data is loaded based on the information specified within the domain blocks (e.g., domain, key, and source information), and made available to the publisher execution context.

If a configuration file is specified by the publisher (e.g., for reusing publishers and indicating various variables, parameters and/or conditions for the publisher execution context), the configuration file is loaded and interpreted in the publisher execution context at step 1130.

Record blocks 620 within the publisher are executed for each record of input data at step 1135 to produce zero or more target records for that input data record. For example, each execution of the logic defined in a record block 620 produces zero or more hash values for a resulting target record that represent corresponding target fields of the target data model. Each hash value is evaluated by a conversion engine of the publisher execution context (e.g., a JAVA or other process) to translate the mapping performed by the publisher logic to corresponding data objects (e.g., JAVA or other objects) representing the target data model.

The newly created instances or records of the target model produced by the publisher are subsequently loaded into the target data store (e.g., factory grid 160) at step 1140.

The above processing may be performed in various modes. For example, the processing may be performed in a distributed batch mode (e.g., using HADOOP MapReduce or other parallel processing framework). In this case, the publisher is loaded and executed in staging grid 150 (e.g., a HADOOP distributed file system (HDFS)) as described above in the context of a MapReduce job (e.g., on that HADOOP distributed file system (HDFS)).

As input records (e.g., in the source data models) are read during a map phase of the MapReduce job, the publisher receives the input data records through the publisher execution context, and produces zero or more target data records in substantially the same manner described above. By way of example, the MapReduce job creates the conversion engine context that holds the publisher. The conversion engine receives the schema for the source data (e.g., provided from APACHE AVRO or other structured or unstructured data format) that provides the source fields the publisher has available. The MapReduce job executes on the HADOOP distributed file system (HDFS) (e.g., staging grid 150) and passes each source record to the conversion engine. The conversion engine, via the publisher, returns zero or more target records based on the transformation defined by the publisher. However, the conversion engine is not limited to MapReduce jobs and may be used in any context. The resulting target data records are loaded into the target data store. The batch processing mode is preferably used for large scale data transformation and loading.

Another example mode for the above processing includes a serial mode. In this case, the input data records in the source data model are read individually, and fed to the publisher through the publisher execution context to produce zero or more target data records in substantially the same manner described above for FIG. 11. The serial mode may further utilize MapReduce jobs as described above to employ distributed processing.

In addition, present invention embodiments may provide an editor (e.g., via transformation module 260) to enable development and testing of publishers. The editor may provide a user interface to enable entry of blocks and statements to create a publisher, and to enable execution of the created publisher in the publisher execution context. The serial mode of processing described above is preferably used during the development of the publisher to provide a short feedback loop between writing a new publisher and testing that publisher on a sample of source data.

In this case, input data records in the source data model from a sample data set are read individually, and fed to the publisher under development through the publisher execution context to produce zero or more target data records in substantially the same manner described above for FIG. 11. MapReduce jobs may be utilized to execute the publisher as described above to employ distributed processing. The publisher may be executed for individual records or any quantity of records, where the resulting output may be viewed in the editor in order to provide feedback for modifying the publisher. Since the publisher is implemented in an interpreted computer language (e.g., interpreted at runtime without compilation), the publisher may be executed with results produced in a short time for prompt feedback and quicker publisher development.

It will be appreciated that the embodiments described above and illustrated in the drawings represent only a few of the many ways of implementing embodiments for transforming and loading data from a source data system to a target data system.

The environments of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, transformation module, etc.). These systems may include any types of monitors and input devices (e.g., keyboard, mouse, voice recognition, etc.) to enter and/or view information.

It is to be understood that the software (e.g., transformation module, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, clustered computer systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., transformation module, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The environments may employ any number of any conventional or other databases, data stores or storage structures (e.g., files, databases, data structures, data or other repositories, distributed database or storage systems, etc.) to store information. The database or storage systems may be implemented by any number of any conventional or other databases, data stores or storage structures (e.g., files, databases, data structures, data or other repositories, etc.) to store information. The database system may be included within or coupled to the server and/or client systems. The database systems and/or storage structures may be remote from or local to the computer or other processing systems, and may store any desired data.

The present invention embodiments may be utilized to transfer data between any source and target systems employing any types of data models, data structures, data layouts, or arrangements of the data. The data may be structured and/or unstructured and in any type of data object or structure, where the domain specific language (DSL) may include logic to perform any suitable transformations or other functions on the data.

The domain specific language (DSL) of present invention embodiments may include any types of elements (e.g., constructs or blocks, statements (e.g., various expressions, commands, calls, functions, logic, declarations, etc.), etc.) with any syntax, identifiers, or functions, and may be utilized to define any logic for any functions (e.g., transformations, rounding/truncation, mathematical and/or logical operations, conversions, etc.) applied to the data for various purposes (e.g., transform/load, extraction, searching, compression/consolidation, matching, entity resolution, etc.). The elements of the DSL may be arranged in any fashion within a publisher or other module (e.g., any order of execution, nested within other elements, DSL specific elements intertwined with actual underlying computer language elements, etc.). The publisher may process any quantity of any input objects at a time, and produce any quantity of target objects for one or more input objects.

By way of example, present invention embodiments preferably employ the Ruby programming language as the underlying computer language for the domain specific language (DSL). However, any desired computer or programming language may be employed, preferably ones that are interpretive to avoid compilation and provide quicker processing and results. Further, any execution environment or context (e.g., compatible with the underlying programming language or compatible with object or other executable code generated from the publisher) may be established to execute the publisher.

The editor may employ any type of user interface, and enable any suitable operations to create, update, and/or execute a publisher or other domain specific language (DSL) module (e.g., open, save, edit, cut, copy, paste, execute, update/overwrite text, etc.). The editor may provide execution results to a user in any fashion, and may control execution of the publisher to provide results for any quantity of records (e.g., one record at a time, a plurality or group of records at a time, etc.).

The present invention embodiments may employ any number of any type of user interface (e.g., Graphical User Interface (GUI), command-line, prompt, etc.) for obtaining or providing information (e.g., publishers, execution instructions, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

Reports may include any information arranged in any fashion, and may be configurable based on rules or other criteria to provide desired information to a user (e.g., results of publisher execution, etc.).

The present invention embodiments are not limited to the specific tasks or algorithms described above, but may be utilized in any computing environment for transforming (and loading) data between any source and target systems employing differing data models. Further, the domain specific language (DSL) of present invention embodiments may be utilized to define logic for any suitable processing or transformation of the data. This simplifies expression of complex processing or transformations.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages (e.g., Ruby, interpretive languages, compiled languages, assembled languages, etc.). The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of transferring data between a source system and a target system comprising:

receiving, via at least one processor, a module including procedural logic for transforming source data of a source data model to a target data model to produce one or more target data objects for the target data model, wherein the procedural logic is expressed by one or more elements of a domain specific language implemented by an underlying computer language, wherein the one or more elements define mappings and structure for the one or more target data objects and include at least one element undefined in the underlying computer language;

generating, via the at least one processor, an execution context and loading the module into the execution context, wherein the execution context interprets and executes the one or more elements of the domain specific language;

executing the module, via the at least one processor, within the generated execution context to process the source data and produce for each record of the source data zero or more of the target data objects in accordance with the mappings and structure defined within the procedural logic by the one or more elements; and loading the one or more target data objects produced from execution of the module in the target system.

2. The method of claim 1, wherein the one or more elements include one or more from a group of:

a mapping statement to map source data to a field of the one or more target data objects in response to satisfaction of a condition specified within the mapping statement;

a selection construct to select a value from among a plurality of values to be mapped to a field of the one or more target data objects based on a value of the corresponding source data;

an explore construct to map source data from a nested source data structure including one or more source data objects to fields of the one or more target data objects; and a group construct to produce a plurality of source data items for a field of the one or more target data objects.

3. The method of claim 1, wherein the one or more elements produce a plurality of different target data objects from a common source data object.

4. The method of claim 1, wherein the underlying computer language includes a Ruby programming language, and executing the module further comprises:

executing the module on a HADOOP computing cluster including the at least one processor.

5. The method of claim 1, wherein executing the module further comprises:

executing the module from an editor and presenting the produced one or more target data objects indicating modifications for the module.

6. The method of claim 1, wherein the procedural logic of the module is further expressed by at least one element of the underlying computer language.

7. The method of claim 1, wherein the one or more elements include at least one configurable variable for use of the module with a plurality of different source systems.

8. A system for transferring data between a source system and a target system comprising:

at least one processor configured to:

receive a module including procedural logic for transforming source data of a source data model to a target data model to produce one or more target data objects for the target data model, wherein the procedural logic is expressed by one or more elements of a domain specific language implemented by an underlying computer language, wherein the one or more elements define mappings and structure for the one or more target data objects and include at least one element undefined in the underlying computer language;

generate an execution context and load the module into the execution context, wherein the execution context interprets and executes the one or more elements of the domain specific language;

execute the module within the generated execution context to process the source data and produce for each record of the source data zero or more of the target data objects in accordance with the mappings and structure defined within the procedural logic by the one or more elements; and load the one or more target data objects produced from execution of the module in the target system.

9. The system of claim 8, wherein the one or more elements include one or more from a group of:

a mapping statement to map source data to a field of the one or more target data objects in response to satisfaction of a condition specified within the mapping statement;

a selection construct to select a value from among a plurality of values to be mapped to a field of the one or more target data objects based on a value of the corresponding source data;

an explore construct to map source data from a nested source data structure including one or more source data objects to fields of the one or more target data objects; and a group construct to produce a plurality of source data items for a field of the one or more target data objects.

10. The system of claim 8, wherein the one or more elements produce a plurality of different target data objects from a common source data object.

11. The system of claim 8, wherein the underlying computer language includes a Ruby programming language, and wherein the system further comprises:

a HADOOP computing cluster including the at least one processor.

12. The system of claim 8, wherein executing the module further comprises:

executing the module from an editor and presenting the produced one or more target data objects indicating modifications for the module.

13. The system of claim 8, wherein the procedural logic of the module is further expressed by at least one element of the underlying computer language.

14. The system of claim 8, wherein the one or more elements include at least one configurable variable for use of the module with a plurality of different source systems.

15. A computer program product for transferring data between a source system and a target system, the computer program product comprising one or more non-transitory computer readable storage media collectively having program instructions embodied therewith, the program instructions executable by at least one processor to cause the at least one processor to:

receive a module including procedural logic for transforming source data of a source data model to a target data model to produce one or more target data objects for the target data model, wherein the procedural logic is expressed by one or more elements of a domain specific language implemented by an underlying computer language, wherein the one or more elements define mappings and structure for the one or more target data objects and include at least one element undefined in the underlying computer language;

generate an execution context and load the module into the execution context, wherein the execution context interprets and executes the one or more elements of the domain specific language;

execute the module within the generated execution context to process the source data and produce for each record of the source data zero or more of the target data objects in accordance with the mappings and structure defined within the procedural logic by the one or more elements; and load the one or more target data objects produced from execution of the module in the target system.

16. The computer program product of claim 15, wherein the one or more elements include one or more from a group of:

a mapping statement to map source data to a field of the one or more target data objects in response to satisfaction of a condition specified within the mapping statement;

a selection construct to select a value from among a plurality of values to be mapped to a field of the one or more target data objects based on a value of the corresponding source data;

an explore construct to map source data from a nested source data structure including one or more source data objects to fields of the one or more target data objects; and a group construct to produce a plurality of source data items for a field of the one or more target data objects.

17. The computer program product of claim 15, wherein the one or more elements produce a plurality of different target data objects from a common source data object.

18. The computer program product of claim 15, wherein the underlying computer language includes a Ruby programming language, and executing the module further comprises:

executing the module on a HADOOP computing cluster including the at least one processor.

19. The computer program product of claim 15, wherein executing the module further comprises:

executing the module from an editor and presenting the produced one or more target data objects indicating modifications for the module.

20. The computer program product of claim 15, wherein the procedural logic of the module is further expressed by at least one element of the underlying computer language, and the one or more elements include at least one configurable variable for use of the module with a plurality of different source systems.

* * * * *